United States Patent
Xu et al.

(10) Patent No.: US 10,509,847 B1
(45) Date of Patent: Dec. 17, 2019

(54) LOCAL OUTLIER FACTOR HYPERPARAMETER TUNING FOR DATA OUTLIER DETECTION

(71) Applicant: SAS Institute Inc., Cary, NC (US)

(72) Inventors: Zekun Xu, Cary, NC (US); Deovrat Vijay Kakde, Cary, NC (US); Arin Chaudhuri, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/411,214

(22) Filed: May 14, 2019

Related U.S. Application Data

(60) Provisional application No. 62/803,866, filed on Feb. 11, 2019.

(51) Int. Cl.
  *G06F 17/18* (2006.01)
  *G06F 17/16* (2006.01)

(52) U.S. Cl.
  CPC .............. *G06F 17/18* (2013.01); *G06F 17/16* (2013.01)

(58) Field of Classification Search
  None
  See application file for complete search history.

(56) References Cited

U.S. PATENT DOCUMENTS 9,524,315 B1 * 12/2016 Bonham ................. G06F 21/00

OTHER PUBLICATIONS

Lee et al., "Integrating independent component analysis and local outlier factor for plant-wide process monitoring" Journal of Process Control 21 (2011) 1011-1021 (Year: 2011).*
Breunig et al., LOF: Identifying Density-Based Local Outliers, Proc. ADM SIGMOD 2000 Int. Conf. on Management of Data, 2000, pp. 1-12.
Kriegel et al., LoOP: Local Outlier Probabilities, CIKM'09, Nov. 2-6, 2009, pp. 1649-1652.
Breunig et al., OPTICS-OF: Identifying Local Outliers, Proceedings of the 3$^{rd}$ European Conference on Principles and Practice of Knowledge Discovery in Databases (PKDD'99), Sep. 1999, 9 pages.
Kriegel et al., Interpreting and Unifying Outlier Scores, 11$^{th}$ SIAM International Conference on Data Mining (SDM), 2011, pp. 13-24.

(Continued)

*Primary Examiner* — John C Kuan
(74) *Attorney, Agent, or Firm* — Bell & Manning, LLC

(57) ABSTRACT

A computing device determines hyperparameter values for outlier detection. An LOF score is computed for observation vectors using a neighborhood size value. Outlier observation vectors are selected from the observation vectors. Outlier mean and outlier variance values are computed of the LOF scores of the outlier observation vectors. Inlier observation vectors are selected from the observation vectors that have highest computed LOF scores of the observation vectors that are not included in the outlier observation vectors. Inlier mean and inlier variance values are computed of the LOF scores of the inlier observation vectors. A difference value is computed using the outlier mean and variance values and the inlier mean and variance values. The process is repeated with each neighborhood size value of a plurality of neighborhood size values. A tuned neighborhood size value is selected as the neighborhood size value associated with an extremum value of the difference value.

30 Claims, 18 Drawing Sheets

(56) References Cited

OTHER PUBLICATIONS

Schubert et al., On Evaluation of Outlier Rankings and Outlier Scores, Proceedings of the 12th SIAM International Conference on Data Mining, SDM 2012, Apr. 2012, pp. 1047-1058.
Xu et al., Automatic Hyperparameter Tuning Method for Local Outlier Factor, with Applications to Anomaly Detection, Technical Paper, SAS Institute Inc., Mar. 2019, 17 pages.

* cited by examiner

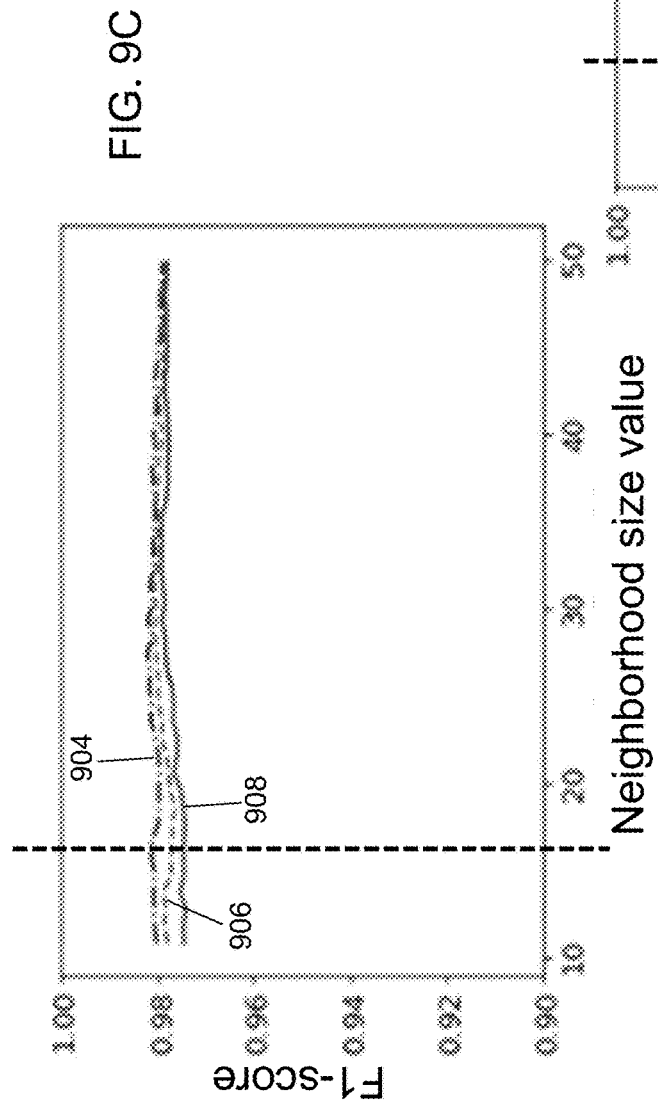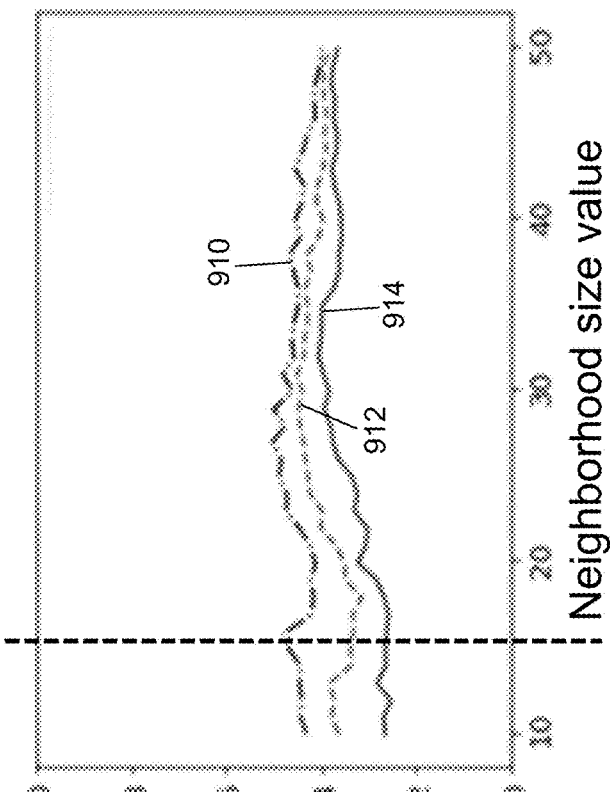
FIG. 9C
FIG. 9D

| Data | Tuned $c$ | Tuned $k$ | F1 Tuned | F1 Best | AUC Tuned | AUC Best |
|---|---|---|---|---|---|---|
| Polygons | 0.01 | 16 | 0.981 | 0.982 | 0.947 | 0.950 |
| Balls | 0.01 | 48 | 0.930 | 0.939 | 0.875 | 0.888 |
| Metal | 0.10 | 14 | 0.844 | 0.844 | 0.886 | 0.886 |

FIG. 11

| Data | Mean F1 | | Mean AUC | | Mean computation time (sec) |
| --- | --- | --- | --- | --- | --- |
| | Tuned | Best | Tuned | Best | |
| Spheres×100 | 0.955 (0.022) | 0.959 (0.022) | 0.988 (0.006) | 0.994 (0.002) | 5.77 |
| Cubes×100 | 0.937 (0.043) | 0.976 (0.005) | 0.987 (0.005) | 0.991 (0.002) | 5.79 |

| Data | Mean F1 | | | | Mean AUC | | | |
|---|---|---|---|---|---|---|---|---|
| | LOF | SVM | IForest | | LOF | SVM | IForest | |
| Http | 0.558 (0.157) | 0.610 (0.107) | 0.356 (0.109) | | 0.849 (0.066) | 0.834 (0.0575) | 0.644 (0.043) | |
| Smtp | 0.662 (0.166) | 0.687 (0.167) | 0.637 (0.062) | | 0.800 (0.057) | 0.814 (0.058) | 0.745 (0.030) | |
| Credit | 0.425 (0.148) | 0.311 (0.112) | 0.295 (0.095) | | 0.762 (0.064) | 0.699 (0.056) | 0.620 (0.038) | |
| Mnist | 0.824 (0.053) | 0.522 (0.056) | 0.570 (0.048) | | 0.728 (0.036) | 0.628 (0.011) | 0.616 (0.013) | |

LOCAL OUTLIER FACTOR HYPERPARAMETER TUNING FOR DATA OUTLIER DETECTION

CROSS-REFERENCE TO RELATED APPLICATIONS

The present application claims priority to and the benefit of 35 U.S.C. § 119(e) to U.S. Provisional Patent Application No. 62/803,866 filed on Feb. 11, 2019, the entire contents of which is hereby incorporated by reference.

BACKGROUND

In recent years, there have been many practical applications of anomaly detection such as in the areas of predictive maintenance, detection of credit fraud, network intrusion, and system failure. The goal of anomaly detection is to identify anomalous behaviors that are either rare or unseen in training data. For example, predictive maintenance aims to predict an imminent fault in operation of a device (appliance, vehicle, pump, engine, etc.) given abundant samples of normal behavior. Local outlier factor (LOF) is a common density-based anomaly detection method. The predictive performance of LOF depends significantly on a selection of two hyperparameter values: a neighborhood size value and a contamination value for which rule-of-thumb or default values are used with limited success due to variations in optimal or near-optimal values that vary based on the data included in the training data.

SUMMARY

In an example embodiment, a non-transitory computer-readable medium is provided having stored thereon computer-readable instructions that, when executed by a computing device, cause the computing device to determine hyperparameter values for a local outlier factor outlier detection. (A) A contamination value is defined. (B) A neighborhood size value is selected from a plurality of neighborhood size values. (C) A local outlier factor (LOF) score is computed for each observation vector of a plurality of observation vectors using the selected neighborhood size value. Each observation vector of the plurality of observation vectors includes a variable value for each variable of a plurality of variables. (D) A number of outlier observation vectors is selected from the plurality of observation vectors to define an outlier set of observation vectors. The number of outlier observation vectors is the defined contamination value. The outlier set of observation vectors have highest computed LOF scores of the plurality of observation vectors. (E) An outlier mean value is computed of the LOF scores computed for the outlier set of observation vectors. (F) An outlier variance value is computed of the LOF scores computed for the outlier set of observation vectors. (G) A number of inlier observation vectors is selected from the plurality of observation vectors to define an inlier set of observation vectors. The number of inlier observation vectors is the defined contamination value. The inlier set of observation vectors have highest computed LOF scores of the plurality of observation vectors that are not included in the outlier set of observation vectors. (H) An inlier mean value is computed of the LOF scores computed for the inlier set of observation vectors. (I) An inlier variance value is computed of the LOF scores computed for the inlier set of observation vectors. (J) A difference value is computed using the computed outlier mean value, the computed outlier variance value, the computed inlier mean value, and the computed inlier variance value. (K) (B) to (J) are repeated with each remaining neighborhood size value of the plurality of neighborhood size values as the selected neighborhood size value. (L) A tuned neighborhood size value is selected as the neighborhood size value associated with an extremum value of the difference value computed for each neighborhood size value of the plurality of neighborhood size values. (M) The selected, tuned neighborhood size value and the defined contamination value are output for determining if a new observation vector is an outlier observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine hyperparameter values for a local outlier factor outlier detection.

In yet another example embodiment, a method of determining hyperparameter values for a local outlier factor outlier detection.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 9C shows an F1-score comparison as a function of various hyperparameter values computed using the first validation dataset of FIG. 9B in accordance with an illustrative embodiment.

FIG. 9D shows an area under a ROC curve (AUC) comparison as a function of various hyperparameter values computed using the first validation dataset of FIG. 9B in accordance with an illustrative embodiment.

FIG. 11 provides a first performance comparison table of an LOF outlier identification with hyperparameter values computed using the operations of FIGS. 3A and 3B and optimal hyperparameter values using three datasets in accordance with an illustrative embodiment.

DETAILED DESCRIPTION

Anomaly detection has practical importance in a variety of applications such as predictive maintenance, intrusion detection in electronic systems, faults in industrial systems, medical diagnosis, etc. Predictive maintenance setups usually assume that a normal class of data points is well sampled in training data, whereas the anomaly class is rare and underrepresented. This assumption is relevant because large critical systems usually produce abundant data for normal activities, but little or no data for anomalous behaviors that may be scarce and evolve with time and that can be used to proactively forecast an imminent failure. Thus, a challenge in anomaly detection is to identify new types of anomalies in test data that are rare or unseen in the available training data.

Local outlier factor (LOF), which is a common methodology used for anomaly detection, has seen many recent application areas including credit card fraud detection, system intrusion detection, out-of-control detection in freight logistics, and battery defect diagnosis. LOF computes an anomaly score by using a local density of each sample point with respect to the points in its surrounding neighborhood. The local density is inversely correlated with an average distance from a point to its nearest neighbors. The anomaly score in LOF is known as an LOF score, which is defined for each observation as a mean local density of the nearest neighbors divided by a local density of an observation.

Figure 2:
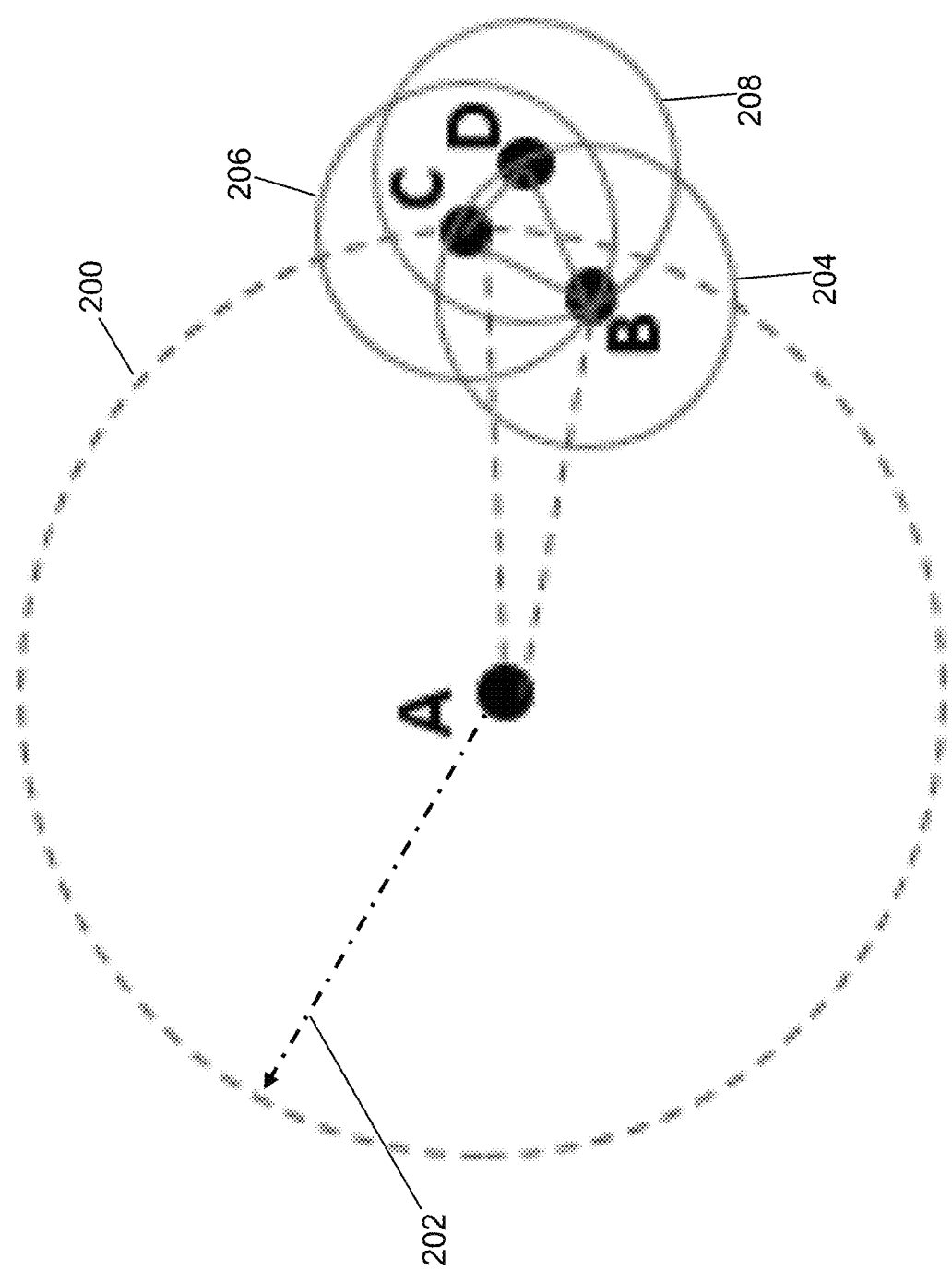
FIG. 2 graphically depicts LOF hyperparameters in accordance with an illustrative embodiment.

LOF assumes anomalies are more isolated than normal data points such that anomalies have a lower local density relative to the neighbors, or equivalently, a higher local outlier factor score. Again, LOF uses two hyperparameters: neighborhood size and contamination. The contamination value determines a proportion of the most isolated points (points with the highest LOF scores) to be predicted as anomalies. Referring to FIG. 2, a simple example of an LOF computation is presented, where the neighborhood size value k was defined as two and the contamination value c was defined as 0.25. An A circle 200 has a radius 202 computed to include two nearest neighbors B and C. Similarly, a B circle 204 has a radius (not shown) computed to include two nearest neighbors C and D; a C circle 206 has a radius (not shown) computed to include two nearest neighbors B and D; and a D circle 208 has a radius (not shown) computed to include two nearest neighbors B and C. Since A is the most isolated point in terms of finding two (neighborhood size value) nearest neighbors among the four points, the LOF method predicts observation A as an anomaly. A single outlier or anomaly is identified because the number of points N=4 multiplied by the contamination value c=0.25 results in Nc=4*0.25=1.

In principle, the neighborhood size value should be lower bounded by a minimum number of points in a cluster while upper bounded by a maximum number of nearest points that can potentially be anomalies. However, such information is generally not available for a training dataset. Even if such information is available, an optimal neighborhood size value between the lower bound and upper bound is still undefined. The contamination value specifies a proportion of data points in the training dataset to be predicted as anomalies, which is strictly positive to form decision boundaries in LOF. In an extreme but not uncommon setting of anomaly detection, there may be zero anomalies in the training dataset. In this case, an arbitrarily small threshold is chosen for the contamination value. The values of these two hyperparameters are critical to the predictive performance in LOF. Since the type and proportion of an anomaly class can be very different between a training dataset and a test dataset, a k-fold cross validation classification error (or accuracy) does not apply.

Figure 1:
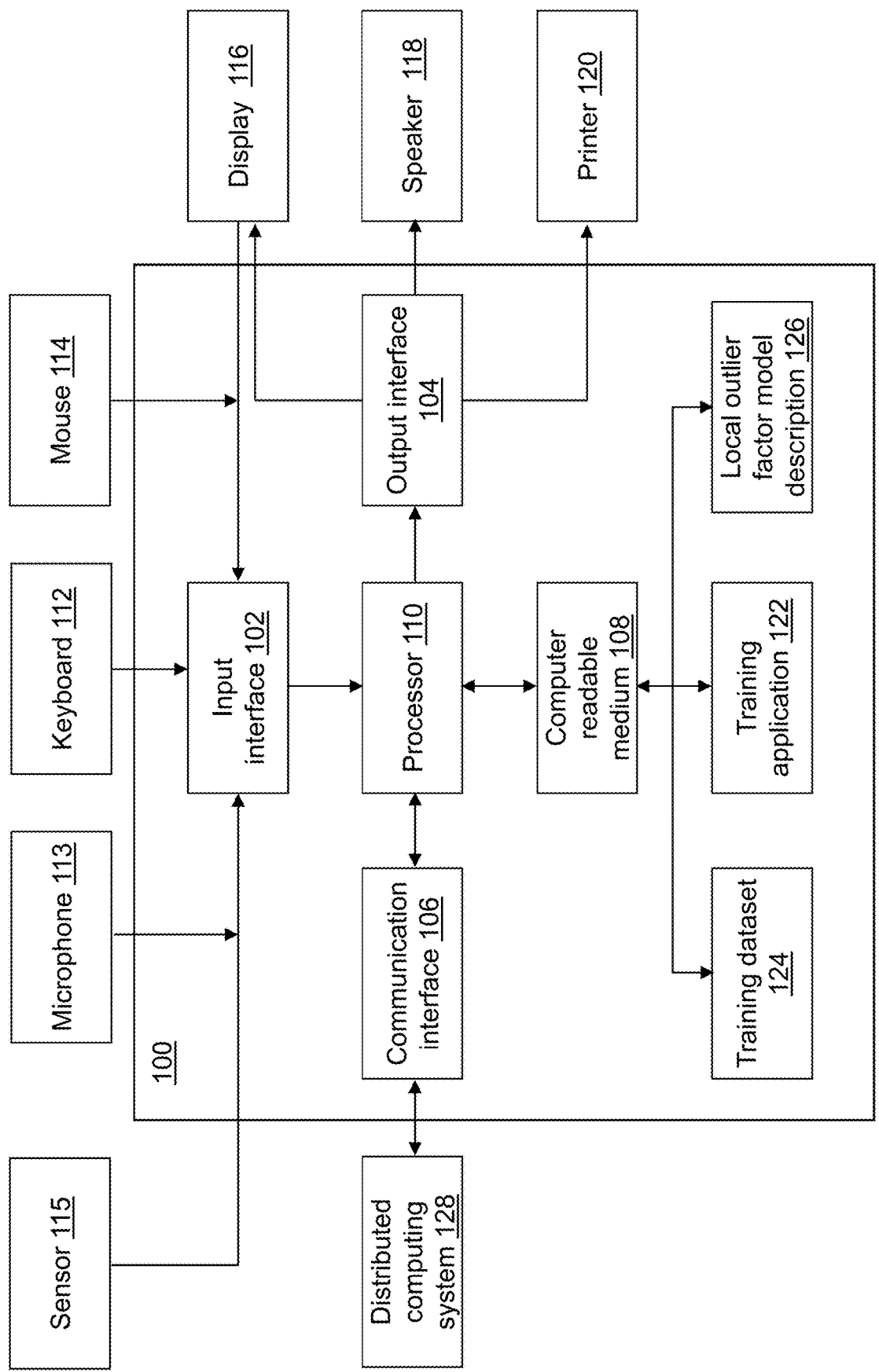
FIG. 1 depicts a block diagram of a local outlier factor (LOF) training device in accordance with an illustrative embodiment.

Referring to FIG. 1, a block diagram of an LOF training device 100 is shown in accordance with an illustrative embodiment. LOF training device 100 may include an input interface 102, an output interface 104, a communication interface 106, a non-transitory computer-readable medium 108, a processor 110, a training application 122, a training dataset 124, and an LOF model description 126. Fewer, different, and/or additional components may be incorporated into LOF training device 100.

Training application 122 jointly tunes the hyperparameters for an LOF model for anomaly detection. Empirical results on simulated and real datasets have been generated with other benchmark anomaly detection methods including support vector data description (SVDD), one-class support vector machine (SVM), and isolation forest (IForest) and are described herein. An LOF model that uses training application 122 to jointly tune the hyperparameters shows good predictive performance for both simulated and real data sets and is data driven thereby solving the problem of defining values for the two hyperparameters that are critical to the predictive performance of an LOF model.

Input interface 102 provides an interface for receiving information from the user or another device for entry into LOF training device 100 as understood by those skilled in the art. Input interface 102 may interface with various input technologies including, but not limited to, a keyboard 112, a microphone 113, a mouse 114, a sensor 115, a display 116, a track ball, a keypad, one or more buttons, etc. to allow the user to enter information into LOF training device 100 or to make selections presented in a user interface displayed on display 116 or to receive input from another device. The same interface may support both input interface 102 and output interface 104. For example, display 116 comprising a touch screen provides a mechanism for user input and for presentation of output to the user. LOF training device 100 may have one or more input interfaces that use the same or a different input interface technology. The input interface technology further may be accessible by LOF training device 100 through communication interface 106.

Output interface 104 provides an interface for outputting information for review by a user of LOF training device 100 and/or for use by another application or device. For example, output interface 104 may interface with various output technologies including, but not limited to, display 116, a speaker 118, a printer 120, etc. LOF training device 100 may have one or more output interfaces that use the same or a different output interface technology. The output interface technology further may be accessible by LOF training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. LOF training device 100 may have one or more communication interfaces that use the same or a different communication interface technology. For example, LOF training device 100 may support communication using an Ethernet port, a Bluetooth antenna, a telephone jack, a USB port, etc. Data and messages may be transferred between LOF training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. LOF training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. LOF training device 100 also may have one or more drives that support the loading of a memory media such as a CD, DVD, an external hard drive, etc. One or more external hard drives further may be connected to LOF training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. LOF training device 100 may include a plurality of processors that use the same or a different processing technology.

Some machine-learning approaches may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with jointly tuning the hyperparameters in LOF and defining LOF model description 126 from data stored in training dataset 124. LOF model description 126 may be used to determine when an observation vector in an input dataset 424 (shown referring to FIG. 4) is an outlier or otherwise anomalous vector of data that may be stored in an outlier dataset 426 (shown referring to FIG. 4) to support various data analysis functions as well as provide alert/messaging related to monitored data. For example, an alert or message may be generated when an outlier is identified. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. For example, training application 122 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, SAS® Forecast Server, all of which are developed and provided by SAS Institute Inc. of Cary, N.C., USA. Data mining is applicable in a wide variety of industries.

Training application 122 may be integrated with other system processing tools to automatically process data generated as part of operation of an enterprise, device, system, facility, etc., to identify any outliers in the processed data, to monitor changes in the data, and to provide a warning or alert associated with the monitored data using input interface 102, output interface 104, and/or communication interface 106 so that appropriate action can be initiated in response to changes in the monitored data.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Training dataset 124 may be transposed. The plurality of variables may define multiple dimensions for each observation vector. An observation vector $x_i$ may include a value for each of the plurality of variables associated with the observation i. All or a subset of the columns may be used as variables used to define observation vector $x_i$. Each variable of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing, developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 124 may be stored on computer-readable medium 108 or on one or more computer-readable media of a distributed computing system 128 and accessed by LOF training device 100 using communication interface 106, input interface 102, and/or output interface 104. Data stored in training dataset 124 may be sensor measurements or signal values captured by sensor 115, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observations per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE), which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on LOF training device 100 or on distributed computing system 128. LOF training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. Some systems may use SAS In-Memory Statistics for Hadoop® to read big data once and analyze it several times by persisting it in-memory for the entire session. Some systems may be of other types and configurations.

Figure 3A:
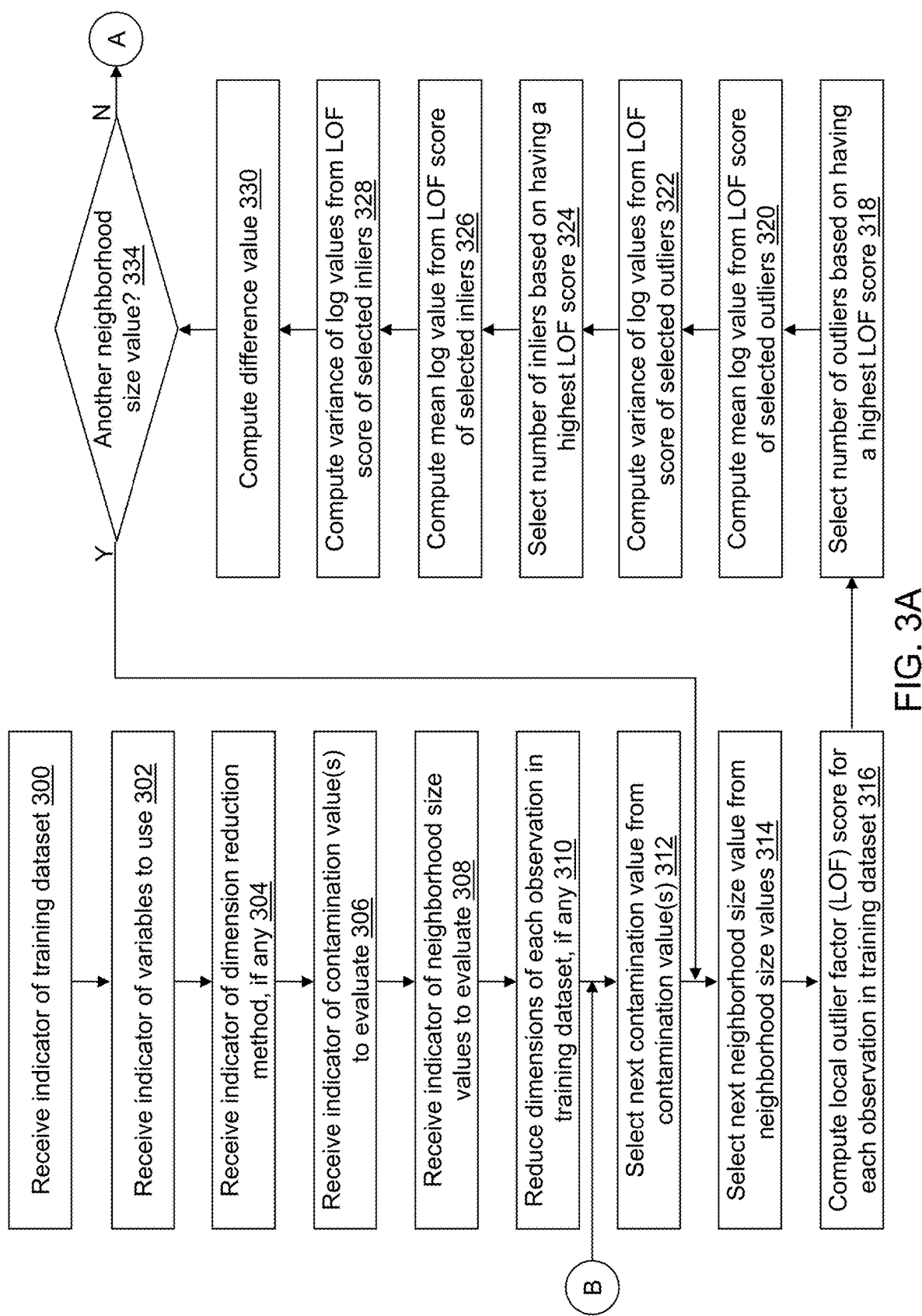
FIGS. 3A to 3B depict a flow diagram illustrating examples of operations performed by the LOF training device of FIG. 1 in accordance with an illustrative embodiment.
Figure 3B:
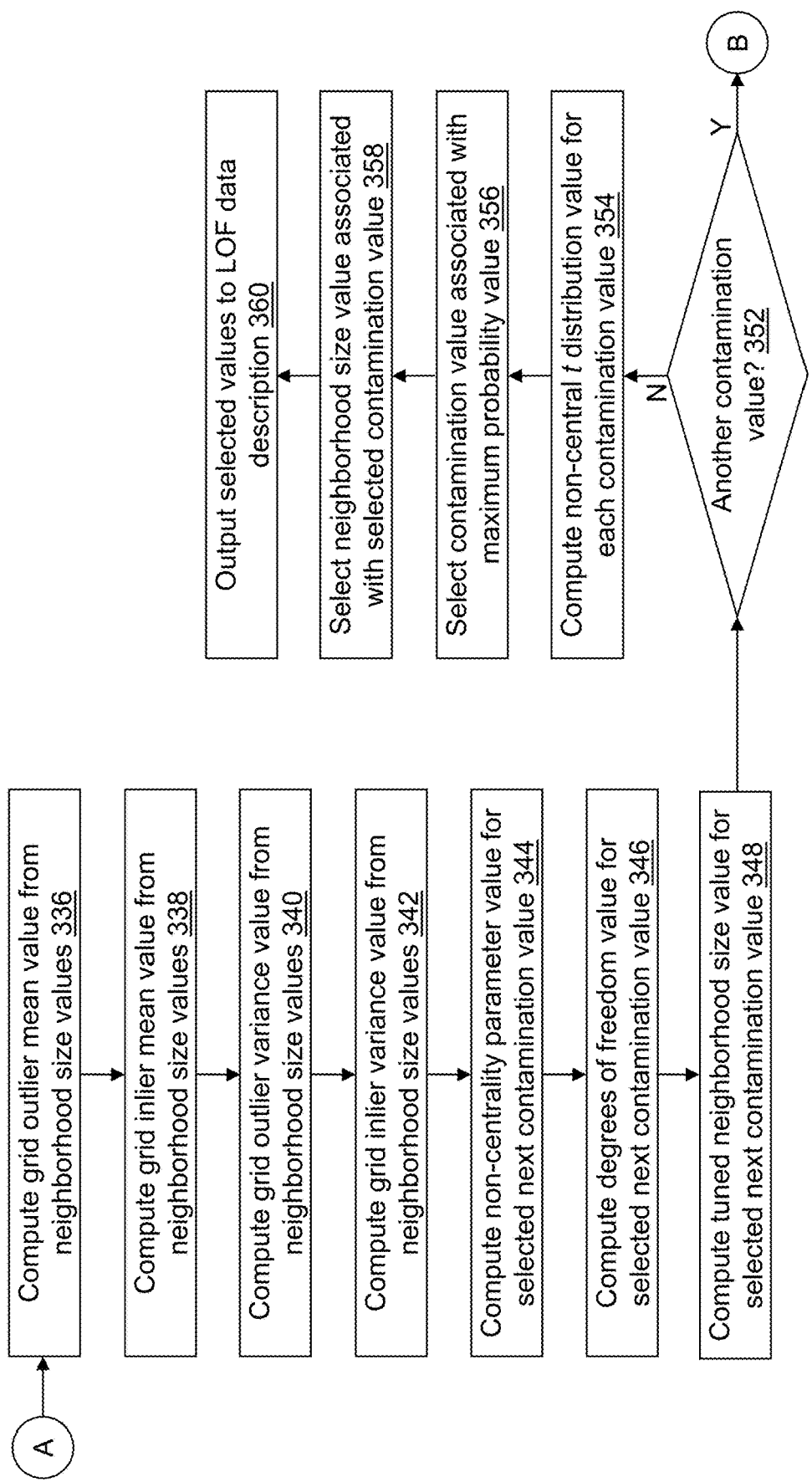

Referring to FIGS. 3A and 3B, example operations associated with training application 122 are described. Additional, fewer, or different operations may be performed depending on the embodiment of training application 122. The order of presentation of the operations of FIGS. 3A and 3B is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute training application 122, which causes presentation of a first user interface window, which may include a plurality of menus and selectors such as drop down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Referring to FIG. 3A, in an operation 300, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically.

In an operation 302, a second indicator may be received that indicates a plurality of variables of training dataset 124 to define $x_i$ for each class. The second indicator may indicate that all or only a subset of the variables stored in training dataset 124 be used to define LOF model description 126. For example, the second indicator indicates a list of variables to use by name, column number, etc. In an alternative embodiment, the second indicator may not be received. For example, all of the variables may be used automatically. The plurality of variables of training dataset 124 to define $x_i$ may be the same for each class.

In an operation 304, a third indicator of a dimension reduction method may be received, if any dimension reduction is requested. For example, the third indicator indicates a name of a dimension reduction method and any associated parameters used to define execution of the dimension reduction method. The third indicator may be received by data labeling application 122 after selection from a user interface window or after entry by a user into a user interface window. A default value for the dimension reduction method may further be stored, for example, in computer-readable medium 108. As an example, a dimension reduction method may be selected from "Principal Components", "Gaussian random projection", "Robust PCA", "Laplacian Eigenmap", Isomap", "LDA", etc. The dimension reduction method may be labeled or selected in a variety of different manners by the user as understood by a person of skill in the art. For illustration, "Principal Components" indicates a principal components procedure, "Gaussian random projection" indicates a Gaussian random projection procedure, "Robust PCA" indicates a robust principal components analysis (PCA) procedure, "Laplacian Eigenmap" indicates a Laplacian eigenmap, "Isomap" indicates an Isomap procedure, and "LDA" indicates a linear discriminant analysis procedure. For illustration, a MWPCA procedure performs principal component analysis using SAS Visual Data Mining and Machine Learning, an RPCA procedure performs robust PCA using SAS Viya, a HPPRINCOMP procedure performs PCA using SAS High-Performance Procedures, a PRINCOMP procedure performs PCA using SAS/STAT, etc. In an alternative embodiment, the dimension reduction method may not be selectable, and a single dimension reduction method is implemented by data labeling application 122. For example, the dimension reduction method indicated as "Gaussian random projection" may be used by default or without allowing a selection.

In an operation 306, a fourth indicator of one or more contamination values c to evaluate may be received. If an anomaly proportion in training dataset 124 is known, that value can be used for contamination value c that includes a single value. In an alternative embodiment, the fourth indicator may not be received. For example, a default one or more values may be stored, for example, in computer-readable medium 108 and used automatically. In another alternative embodiment, the one or more contamination values c may not be selectable. Instead, a fixed, predefined one or more values may be used. The one or more contamination values c to evaluate may be determined using a lower bound value, an upper bound value, and an iteration value defined by the fourth indicator. The one or more contamination values c to evaluate may be determined using the lower bound value, the upper bound value, and a number of contamination values defined by the fourth indicator. The one or more contamination values c to evaluate also may be defined using a list of one or more values. The one or more contamination values c may be received as one or more percentage values or one or more fractional values instead of integer values. When the one or more contamination values c are received as one or more percentage values or one or more fractional values, integer values for each contamination value of the one or more contamination values c may be computed using $c_i = c_i N$, i=, . . . , $N_c$, where N is a number of observation vectors included in training dataset 124, and $N_c$ is a number of the one or more contamination values c. The one or more percentage values may be converted to fractional values before computing the integer values.

In an operation 308, a fifth indicator of a plurality of neighborhood size values k to evaluate may be received. $N_k$ is a number of the plurality of neighborhood size values k. In an alternative embodiment, the fifth indicator may not be received. For example, a default plurality of values may be stored, for example, in computer-readable medium 108 and used automatically. In another alternative embodiment, the plurality of neighborhood size values k may not be selectable. Instead, fixed, predefined values may be used. The plurality of neighborhood size values k to evaluate may be determined using a lower bound value, an upper bound value, and an iteration value defined by the fifth indicator. The plurality of neighborhood size values k to evaluate may be determined using the lower bound value, the upper bound value, and a number of neighborhood size values defined by the fourth indicator. The plurality of neighborhood size values k to evaluate also may be defined using a list of values.

In an operation 310, the dimension reduction method indicated by the third indicator is applied to the observation vectors included in training dataset 300 to define principal components and each observation vector included in training dataset 300 is projected into a space defined by the principal components to define projected observation vectors as the observation vectors used in further processing when a dimension reduction method is indicated in operation 304.

In an operation 312, a next contamination value $c_n$ is selected from the one or more contamination values. For example, on a first iteration of operation 312, a first, and possibly only, contamination value $c_1$ is selected from the one or more contamination values; on a second iteration of operation 312, a second contamination value $c_2$ is selected from the one or more contamination values, etc. until each of the one or more contamination values c indicated in operation 306 is processed.

In an operation 314, a next neighborhood size value $k_n$ is selected from the plurality of neighborhood size values. For example, on a first iteration of operation 314, a first neighborhood size value $k_1$ is selected from the plurality of neighborhood size values; on a second iteration of operation 314, a second neighborhood size value $k_2$ is selected from the plurality of neighborhood size values, etc. until each of the plurality of neighborhood size values k indicated in operation 308 is processed.

In an operation 316, an LOF score is computed for each observation vector included in training dataset 300 using the selected next neighborhood size value $k_n$. The LOF score may be computed using the projected observation vectors when the dimension reduction method is indicated in operation 304.

In an operation 318, a number of outliers defined by the selected next contamination value $c_n$ are selected from the observation vectors included in training dataset 300. The selected outlier observation vectors have the $c_n$ highest computed LOF scores and define an outlier set of observation vectors. A tie value may result in exceeding the $c_n$ highest computed LOF scores. In the case of a tie value, outlier observation vector(s) are randomly selected from the observation vectors having the tie value to result in only the number of outliers defined by the selected next contamination value $c_n$ being selected such that there are always $c_n$ observation vectors included in the selected outlier observation vectors.

In an operation 320, an outlier mean value $\mu_{c_n,k_n,out}$ is computed from the LOF scores computed for the outlier set of observation vectors. The selected next contamination value $c_n$ and the selected next neighborhood size value $k_n$ may be used as indexes to an outlier mean value $\mu_{c_n,k_n,out}$ when $\mu_{out}$ is stored as an array though other data structures may be used to store the values. For example, the outlier mean value $\mu_{c_n,k_n,out}$ is computed as a mean of logarithm values of the LOF scores using $$\mu_{c_n,k_n,out} = \frac{\sum_{i=1}^{c_n} \ln LOF_i}{c_n},$$

where $LOF_i$ is an $i^{th}$ selected outlier observation vector of the outlier set of observation vectors.

In an operation 322, an outlier variance value $v_{c_n,k_n,out}$ is computed from the LOF scores and the outlier mean value $\mu_{out}$ computed for the outlier set of observation vectors. The selected next contamination value $c_n$ and the selected next neighborhood size value $k_n$ may be used as indexes to an outlier variance value $v_{c_n,k_n,out}$ when $v_{out}$ is stored as an array though other data structures may be used to store the values. For example, the outlier variance value $v_{c_n,k_n,out}$ is computed using $$v_{c_n,k_n,out} = \frac{\sum_{i=1}^{c_n}(\ln(LOF_i) - \mu_{c_n,k_n,out})^2}{c_n},$$

where $LOF_i$ is an $i^{th}$ selected outlier observation vector of the outlier set of observation vectors.

In an operation 324, a number of inliers defined by the selected next contamination value $c_n$ are selected from the observation vectors included in training dataset 300. The selected inlier observation vectors have the $c_n$ highest computed LOF scores for observation vectors not selected as outliers in operation 318 and define an inlier set of observation vectors. A tie value may result in exceeding the $c_n$ highest remaining computed LOF scores. In the case of a tie value, inlier observation vector(s) are randomly selected from the observation vectors having the tie value to result in only the number of inliers defined by the selected next contamination value $c_n$ being selected such that there are always $c_n$ observation vectors included in the selected inlier observation vectors.

In an operation 326, an inlier mean value $\mu_{c_n,k_n,in}$ is computed from the LOF scores computed for the inlier set of observation vectors. The selected next contamination value $c_n$ and the selected next neighborhood size value $k_n$ may be used as indexes to an inlier mean value $\mu_{c_n,k_n,in}$ when $\mu_{int}$ is stored as an array though other data structures may be used to store the values. For example, the inlier mean value $\mu_{c_n,k_n,in}$ is computed as a mean of logarithm values of the LOF scores using $$\mu_{c_n,k_n,in} = \frac{\sum_{i=1}^{c_n} \ln LOF_i}{c_n},$$

where $LOF_i$ is an $i^{th}$ selected inlier observation vector of the inlier set of observation vectors.

In an operation 328, an inlier variance value $v_{c_n,k_n,in}$ is computed from the LOF scores and the inlier mean value $\mu_{in}$ computed for the inlier set of observation vectors with the selected next neighborhood size value $k_n$. The selected next contamination value $c_n$ and the selected next neighborhood size value $k_n$ may be used as indexes to an inlier variance value $v_{c_n,k_n,in}$ when $v_{in}$ is stored as an array though other data structures may be used to store the values. For example, the inlier variance value $v_{c_n,k_n,in}$ is computed using $$v_{c_n,k_n,in} = \frac{\sum_{i=1}^{c_n}(\ln(LOF_i) - \mu_{c_n,k_n,in})^2}{c_n},$$

where $LOF_i$ is an $i^{th}$ selected inlier observation vector of the inlier set of observation vectors.

In an operation 330, a difference value $T_{c_n,k_n}$ is computed for the selected next neighborhood size value $k_n$ and the selected next contamination value $c_n$, for example, using $$T_{c_n,k_n} = \frac{\mu_{c_n,k_n,out} - \mu_{c_n,k_n,in}}{\sqrt{\frac{1}{c_n}(v_{c_n,k_n,out} + v_{c_n,k_n,in})}}.$$

The selected next contamination value $c_n$ and the selected next neighborhood size value $k_n$ may be used as indexes to difference value $T_{c_n,k_n}$ when T is stored as an array though other data structures may be used to store the values.

A logarithm transformation serves to symmetrize a distribution of LOF scores and alleviate the influence of extreme values. Instead of focusing on all predicted normal points, the number of inliers having the highest LOF scores are selected because they are most similar to the predicted outliers or anomalies in terms of their LOF scores. The process maximizes a difference between the predicted anomalies and the normal points that are close to the decision boundary.

In an operation 334, a determination is made concerning whether there is another neighborhood size value of the plurality of neighborhood size values to process. When there is another neighborhood size value to process, processing continues in operation 314 to select a next neighborhood size value $k_n$ and to compute the values for the next neighborhood size value $k_n$. When there is not another neighborhood size value to process, processing continues in an operation 336.

Referring to FIG. 3B, in operation 336, a grid outlier mean value $M_{c_n,out}$ is computed as an average of the $\mu_{c_n,k_n,out}$ values computed for each neighborhood size value of the plurality of neighborhood size values. For example, $$M_{c_n,out} = \frac{1}{N_k}\sum_{i=1}^{N_k} \mu_{c_n,k_i,out}.$$

The selected next contamination value $c_n$ may be used as an index to grid outlier mean value $M_{c_n,out}$ when $M_{out}$ is stored as an array though other data structures may be used to store the values.

In an operation 338, a grid inlier mean value $M_{c_n,in}$ is computed as an average of the $\mu_{c_n,k_n,in}$ values computed for each neighborhood size value of the plurality of neighborhood size values. For example, $$M_{c_n,in} = \frac{1}{N_k}\sum_{i=1}^{N_k} \mu_{c_n,k_n,in}.$$

The selected next contamination value $c_n$ may be used as an index to grid inlier mean value $M_{c_n,in}$ when $M_{in}$ is stored as an array though other data structures may be used to store the values.

In an operation 340, a grid outlier variance value $V_{c_n,out}$ is computed, for example, using $$V_{c_n,out} = \frac{1}{N_k}\sum_{i=1}^{N_k} (\mu_{c_n,k_n,out} - M_{c_n,out})^2.$$

The selected next contamination value $c_n$ may be used as an index to grid outlier variance value $V_{c_n,out}$ when $V_{out}$ is stored as an array though other data structures may be used to store the values.

In an operation 342, a grid inlier variance value $V_{c_n,in}$ is computed, for example, using $$V_{c_n,in} = \frac{1}{N_k}\sum_{i=1}^{N_k} (\mu_{c_n,k_n,in} - M_{c_n,in})^2.$$

The selected next contamination value $c_n$ may be used as an index to grid inlier variance value $V_{c_n,in}$ when $V_{in}$ is stored as an array though other data structures may be used to store the values.

In an operation 344, a non-centrality parameter value $p_{c_n}$ is computed for the selected next contamination value $c_n$, for example, using $$p_{c_n} = \frac{M_{c_n,out} - M_{c_n,in}}{\sqrt{\frac{1}{c_n}(V_{c_n,out} + V_{c_n,in})}}$$

The selected next contamination value $c_n$ may be used as an index to non-centrality parameter value $p_{c_n}$ when p is stored as an array though other data structures may be used to store the values.

In an operation 346, a degrees of freedom value $f_{c_n}$ is computed for the next contamination value $c_n$, for example, using $f_{c_n}=2c_n-2$. The selected next contamination value $c_n$ may be used as an index to degrees of freedom value $f_{c_n}$ when f is stored as an array though other data structures may be used to store the values.

In an operation 348, a local tuned neighborhood size value $k_{c_n,tun}$ is selected for the next contamination value $c_n$, for example, using $$k_{c_n,tun} = \arg\max_{k=1,\ldots,N_k} T_{c_n,k}.$$

The selected next contamination value $c_n$ may be used as an index to local tuned neighborhood size value $k_{c_n,tun}$ when $k_{tun}$ is stored as an array though other data structures may be used to store the values.

In an operation 352, a determination is made concerning whether there is another contamination value of the one or more contamination values to process. When there is another contamination value to process, processing continues in operation 312 to select a next contamination value $c_n$ and to compute the values for the next contamination value $c_n$. When there is not another contamination value to process, processing continues in an operation 354.

In operation 354, a non-central t-distribution probability value $PV_i$ is computed for each contamination value of the one or more contamination values, for example, using $$PV_i = P(Z < T_{c_i, k_{c_i, tun}}; f_i, p_{c_i}), i = 1, \ldots, N_c$$

where Z is a random variable that follows the non-central t-distribution, $$T_{c_i, k_{c_i}, opt}$$

is the difference value computed for $k_{c_i, tun}$, $k_{c_i, tun}$ is the local tuned neighborhood size value $k_{c_n, tun}$ for the $i^{th}$ contamination value, $f_i$ is the degrees of freedom value $f_{c_n}$ for the $i^{th}$ contamination value, and $p_{c_i}$ is the non-centrality parameter value $p_{c_n}$ for the $i^{th}$ contamination value. The selected next contamination value $c_n$ may be used as an index to non-central t-distribution probability value $PV_i$ when PV is stored as an array though other data structures may be used to store the values.

In an operation 356, a tuned contamination value $c_{tun}$ is selected from the one or more contamination values, for example, using $c_{tun}=$ $$c_{tun} = \arg\max_{i=1,\ldots,N_c} PV_i.$$

$PV_i$.

In an operation 358, a tuned neighborhood size value $k_{tun}$ is selected as the tuned neighborhood size value $k_{c_{tun}, tun}$ associated with the selected tuned contamination value $c_{tun}$. As described further below, experimental results show that tuned neighborhood size value $k_{tun}$ and tuned contamination value $c_{tun}$ provide near optimal values for the neighborhood size value and the contamination value for a variety of datasets.

In an operation 360, the tuned contamination value $c_{tun}$ and the tuned neighborhood size value $k_{tun}$ may be stored in LOF model description 126. Additionally, training dataset 124 may be stored in LOF model description 126 with the LOF score computed for each observation vector in operation 316. Additionally, an outlier threshold may be determined and stored in LOF model description 126. The outlier threshold is the LOF score value of the lowest LOF score value of the $c_{tun}$ number of highest LOF scores that were identified as outliers.

Figure 4:
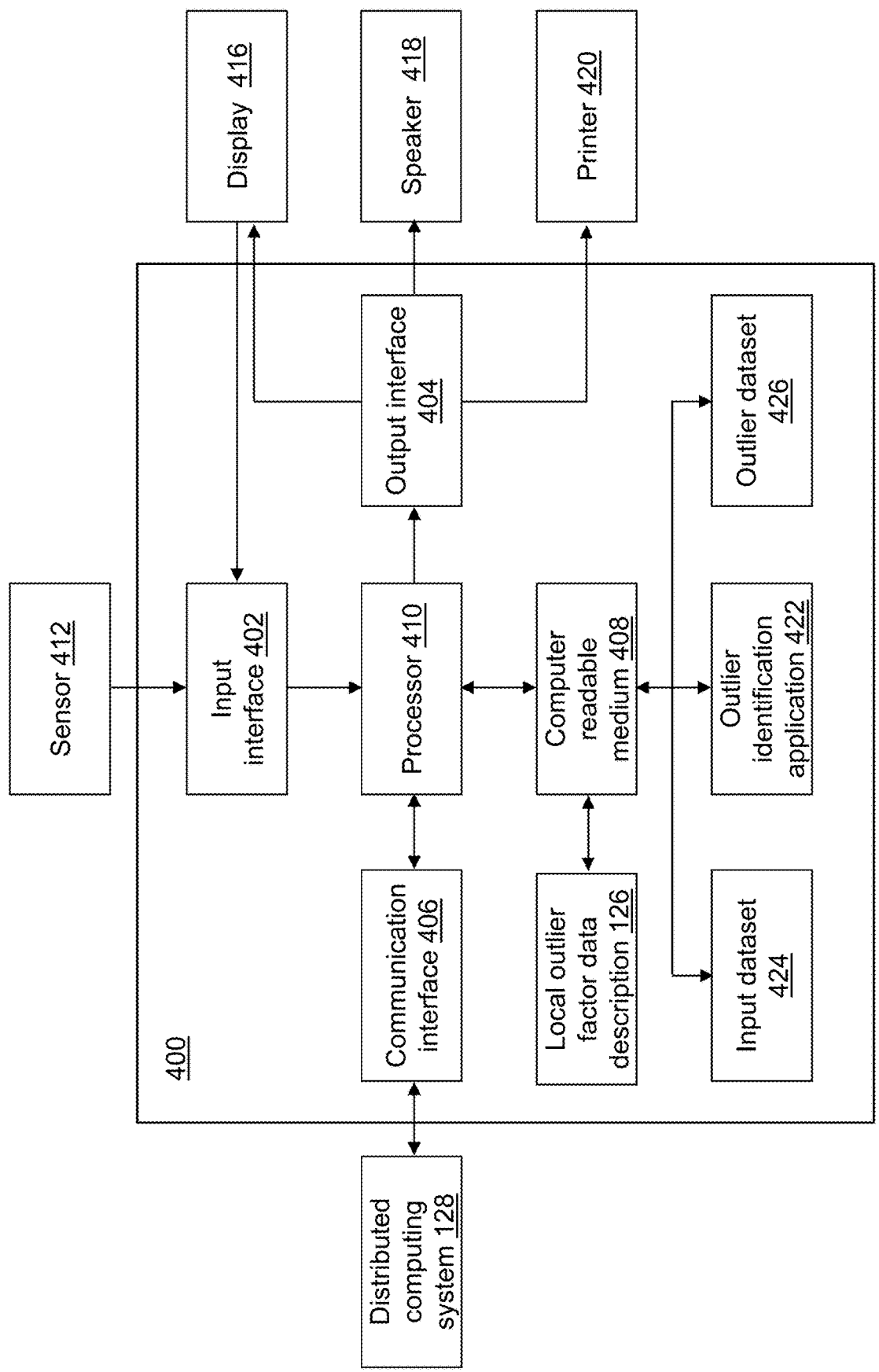
FIG. 4 depicts a block diagram of an outlier identification device in accordance with an illustrative embodiment.

Referring to FIG. 4, a block diagram of an outlier identification device 400 is shown in accordance with an illustrative embodiment. Outlier identification device 400 may include a second input interface 402, a second output interface 404, a second communication interface 406, a second non-transitory computer-readable medium 408, a second processor 410, an outlier identification application 422, LOF model description 126, an input dataset 424, and an outlier dataset 426. Fewer, different, and/or additional components may be incorporated into outlier identification device 400. Outlier identification device 400 and LOF training device 100 may be the same or different devices.

Second input interface 402 provides the same or similar functionality as that described with reference to input interface 102 of LOF training device 100 though referring to outlier identification device 400. Second output interface 404 provides the same or similar functionality as that described with reference to output interface 104 of LOF training device 100 though referring to outlier identification device 400. Second communication interface 406 provides the same or similar functionality as that described with reference to communication interface 106 of LOF training device 100 though referring to outlier identification device 400. Data and messages may be transferred between outlier identification device 400 and distributed computing system 128 using second communication interface 406. Second computer-readable medium 408 provides the same or similar functionality as that described with reference to computer-readable medium 108 of LOF training device 100 though referring to outlier identification device 400. Second processor 410 provides the same or similar functionality as that described with reference to processor 110 of LOF training device 100 though referring to outlier identification device 400.

Outlier identification application 422 performs operations associated with creating outlier dataset 426 from data stored in input dataset 424 using LOF model description 126. LOF model description 126 may be used to identify outliers in input dataset 424 that are then stored in outlier dataset 426 to support various data analysis functions as well as provide alert/messaging related to the identified outliers stored in outlier dataset 426. Dependent on the type of data stored in training dataset 124 and input dataset 424, outlier dataset 426 may identify anomalies as part of process control, for example, of a manufacturing process, for machine condition and/or fault monitoring, for example, of an electro-cardiogram device, of a rotary machine, a wind turbine, a vehicle such as a truck, car, train, etc., for suspicious behavior detection in cyber security, etc. Some or all of the operations described herein may be embodied in outlier identification application 422. The operations may be implemented using hardware, firmware, software, or any combination of these methods.

Referring to the example embodiment of FIG. 4, outlier identification application 422 is implemented in software (comprised of computer-readable and/or computer-executable instructions) stored in second computer-readable medium 408 and accessible by second processor 410 for execution of the instructions that embody the operations of outlier identification application 422. Outlier identification application 422 may be written using one or more programming languages, assembly languages, scripting languages, etc. Outlier identification application 422 may be integrated with other analytic tools. For example, outlier identification application 422 may be part of SAS® Enterprise Miner™ and/or SAS® Viya™ developed and provided by SAS Institute Inc. of Cary, N.C. that may be used to create highly accurate predictive and descriptive models based on analysis of vast amounts of data from across an enterprise. Outlier identification application 422 further may be incorporated into SAS® Event Stream Processing.

Outlier identification application 422 may be implemented as a Web application. Outlier identification application 422 may be integrated with other system processing tools to automatically process data generated as part of operation of an enterprise, to identify any outliers in the processed data, and to provide a warning or alert associated with identification of an outlier using second input interface 402, second output interface 404, and/or second communication interface 406 so that appropriate action can be initiated in response to the outlier identification. Outlier identification application 422 and training application 122 further may be integrated applications.

Training dataset 124 and input dataset 424 may be generated, stored, and accessed using the same or different mechanisms. Similar to training dataset 124, input dataset 424 may include a plurality of rows and a plurality of columns with the plurality of rows referred to as observations or records, and the columns referred to as variables that are associated with an observation. Input dataset 424 may be transposed.

Similar to training dataset 124, input dataset 424 may be stored on second computer-readable medium 408 or on one or more computer-readable media of distributed computing system 128 and accessed by outlier identification device 400 using second communication interface 406. Data stored in input dataset 424 may be a sensor measurement or a data communication value, may be generated or captured in response to occurrence of an event or a transaction, generated by a device such as in response to an interaction by a user with the device, etc. The data stored in input dataset 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 424 may be captured at different time points periodically or intermittently, when an event occurs, etc. One or more columns may include a time value. Similar to training dataset 124, data stored in input dataset 424 may be generated as part of the IoT, and some or all data may be processed with an ESPE.

Similar to training dataset 124, input dataset 424 may be stored in various compressed formats such as a coordinate format, a compressed sparse column format, a compressed sparse row format, etc. Input dataset 424 further may be stored using various structures as known to those skilled in the art including a file system, a relational database, a system of tables, a structured query language database, etc. on LOF training device 100, on outlier identification device 400, and/or on distributed computing system 128. Outlier identification device 400 and/or distributed computing system 128 may coordinate access to input dataset 424 that is distributed across a plurality of computing devices. For example, input dataset 424 may be stored in a cube distributed across a grid of computers as understood by a person of skill in the art. As another example, input dataset 424 may be stored in a multi-node Hadoop® cluster. As another example, input dataset 424 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in input dataset 424.

Figure 5:
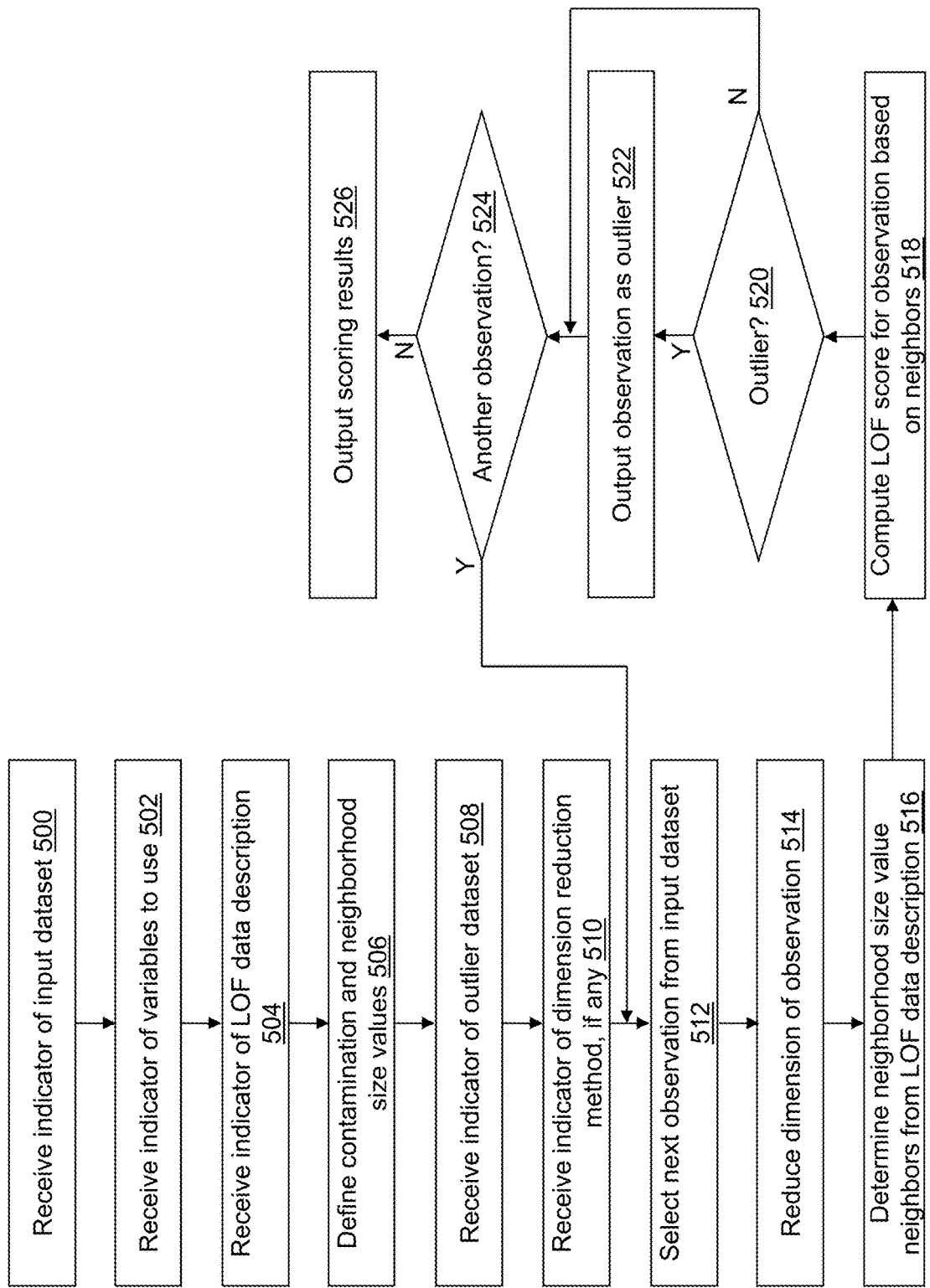
FIG. 5 depicts a flow diagram illustrating examples of operations performed by the outlier identification device of FIG. 4 in accordance with an illustrative embodiment.

Referring to FIG. 5, example operations of outlier identification application 422 to use LOF model description 126 to classify input dataset 424 and create outlier dataset 426 are described. Additional, fewer, or different operations may be performed depending on the embodiment of outlier identification application 422. The order of presentation of the operations of FIG. 5 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 500, a sixth indicator is received that indicates input dataset 424. For example, the sixth indicator indicates a location and a name of input dataset 424. As an example, the sixth indicator may be received by outlier identification application 422 after selection from a user interface window or after entry by a user into a user interface window. In an alternative embodiment, input dataset 424 may not be selectable. For example, a most recently created dataset may be used automatically or observation vectors may be streamed to outlier identification application 422 from an event publishing application executing at a computing device of distributed computing system 128.

In an operation 502, a seventh indicator may be received that indicates a plurality of variables of input dataset 424 to define observation vector z. The same set of the plurality of variables selected in operation 302 to define LOF model description 126 are typically selected. The seventh indicator may indicate that all or only a subset of the variables stored in input dataset 424 be used to determine whether an observation vector is an outlier. For example, the seventh indicator indicates a list of variables to use by name, column number, etc. In an alternative embodiment, the tenth indicator may not be received. For example, all of the variables may be used automatically.

In an operation 504, an eighth indicator is received that indicates LOF model description 126. For example, the eighth indicator indicates a location and a name of LOF model description 126. As an example, the eighth indicator may be received by outlier identification application 422 after selection from a user interface window or after entry by a user into a user interface window. In an alternative embodiment, LOF model description 126 may not be selectable. For example, a default name and location for LOF model description 126 may be used automatically.

In an operation 506, the tuned contamination value $c_{tun}$, the tuned neighborhood size value $k_{tun}$, the observations stored in training dataset 124, and/or the LOF score computed for each observation vector that are stored in LOF model description 126 are defined. For example, the tuned contamination value $c_{tun}$, the tuned neighborhood size value $k_{tun}$, the observations stored in training dataset 124, and/or the LOF score computed for each observation vector are read from LOF model description 126 to define the trained LOF model. In an alternate embodiment, LOF model description 126 may include an indicator of training dataset 124 or training dataset 124 may otherwise be provided as an input to outlier identification application 422. Optionally, the outlier threshold may be read from LOF model description 126 or determined from the LOF scores stored in LOF model description 126.

In an operation 508, a ninth indicator is received that indicates outlier dataset 426. For example, the ninth indicator indicates a location and a name of outlier dataset 426. As an example, the ninth indicator may be received by outlier identification application 422 after selection from a user interface window or after entry by a user into a user interface window. In an alternative embodiment, outlier dataset 426 may not be selectable. For example, a default name and location for outlier dataset 426 may be used automatically or an outlier may be sent to a subscribing device as part of an event stream instead of being stored in outlier dataset 426.

Similar to operation 304, in an operation 510, a tenth indicator of a dimension reduction method may be received, if any dimension reduction is requested. The same dimension reduction method selected in operation 304 to define LOF model description 126 is typically selected. Alternatively, the principal components computed in operation 310 may be stored in LOF model description 126 in operation 360 and read from LOF model description 126 to indicate the dimension reduction method.

In an operation 512, the values for the plurality of variables are read from input dataset 424 as observation vector z. In another embodiment, the first observation may be received from another computing device in an event stream and selected as observation vector z. In still another embodiment, the first observation may be received from a sensor 412 through second input interface 402 or second communication interface 406 and selected as observation vector z.

The observation vector may include values received from a plurality of sensors of the same or different types connected to a device or mounted in a location or an area. For example, sensor 412 may produce a sensor signal value referred to as a measurement data value representative of a measure of a physical quantity in an environment to which sensor 412 is associated and generate a corresponding measurement datum that may be associated with a time that the measurement datum is generated. The environment to which sensor 412 is associated for monitoring may include a power grid system, a telecommunications system, a fluid (oil, gas, water, etc.) pipeline, a transportation system, an industrial device, a medical device, an appliance, a vehicle, a computing device, etc. Example sensor types of sensor 512 include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system.

Similar to operation 310, in an operation 514, the dimension reduction method indicated by the tenth indicator is applied to the next observation vector z to project observation vector z into the space defined by the principal components to define a projected observation vector as the next observation vector z used in further processing when a dimension reduction method is indicated in operation 510. When the principal components are read from LOF model description 126, the next observation vector z is projected into the space defined by the principal components to define the projected observation vector as the next observation vector z.

In an operation 516, the $k_{tun}$ number of nearest neighbors to the next observation vector z are determined from the observations read from LOF model description 126 by computing a distance between the next observation vector z and each observation read from LOF model description 126 and selecting the $k_{tun}$ number of observation vectors that have a minimum distance to the next observation vector z.

In an operation 518, an LOF score is computed for the next observation vector z based on the nearest neighbors determined in operation 516.

In an operation 520, a determination is made concerning whether or not the next observation vector z is an outlier. When the next observation vector z is an outlier, processing continues in an operation 522. When the next observation vector z is not an outlier, processing continues in an operation 524. For example, the next observation vector z is an outlier when the LOF score computed in operation 518 exceeds the outlier threshold that may be read from or computed from data stored in LOF model description 126 as discussed previously.

In operation 522, the next observation vector z and/or an indicator of observation vector z is stored to outlier dataset 526, and processing continues in operation 524.

In operation 524, a determination is made concerning whether or not input dataset 424 includes another observation or another observation vector has been received. When there is another observation, processing continues in an operation 512 to determine if the next observation is an outlier. When there is not another observation, processing continues in an operation 526.

In operation 526, scoring results are output. For example, statistical results associated with the scoring may be stored on one or more devices and/or on second computer-readable medium 408 in a variety of formats as understood by a person of skill in the art. Outlier dataset 426 and/or the scoring results further may be output to a second display 416, to a second printer 420, etc. In an illustrative embodiment, an alert message may be sent to another device using second communication interface 406, printed on second printer 420 or another printer, presented visually on second display 416 or another display, presented audibly using a second speaker 418 or another speaker when an outlier is identified.

Processing may be complete or may continue in operation 512 when additional observation vectors are received, for example, in an event stream or read, for example, when input dataset 124 is updated to include additional observation vectors. For example, observation vectors may be continuously or periodically received from one or more sensors such as sensor 412 through second input interface 402 or second communication interface 406.

Figure 6A:
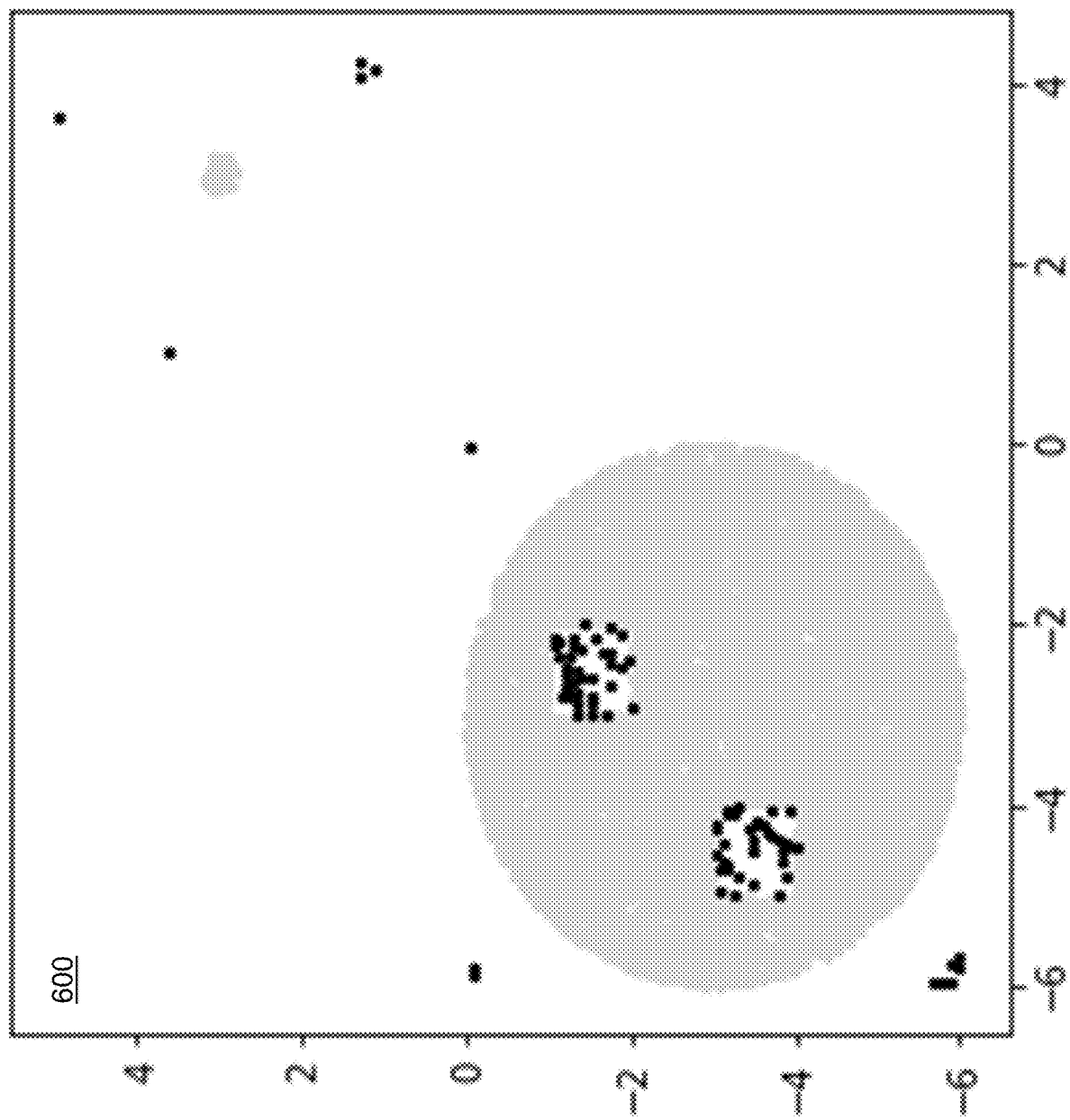
FIGS. 6A, 6B, and 6C provide a performance comparison between an LOF outlier identification and a support vector data description outlier identification in accordance with an illustrative embodiment.

Referring to FIG. 6A, a first dataset 600 is shown with true labels indicating whether each observation vector is an inlier or an outlier where inliers are shown in gray and outliers are shown in black. Referring to FIG. 6B, first performance results 602 are shown using a tuned LOF process. Use of training application 122 to compute the tuned contamination value $c_{tun}$ and the tuned neighborhood size value $k_{tun}$ with outlier identification application 422 to determine the inliers and outliers of the input dataset is referred to as the tuned LOF process. The tuned LOF process was used to identify the inliers shown in gray, and the outliers shown in black of first dataset 600. An area under a ROC curve (AUC) score using the tuned LOF process was 0.84 using first dataset 600.

Figure 6C:
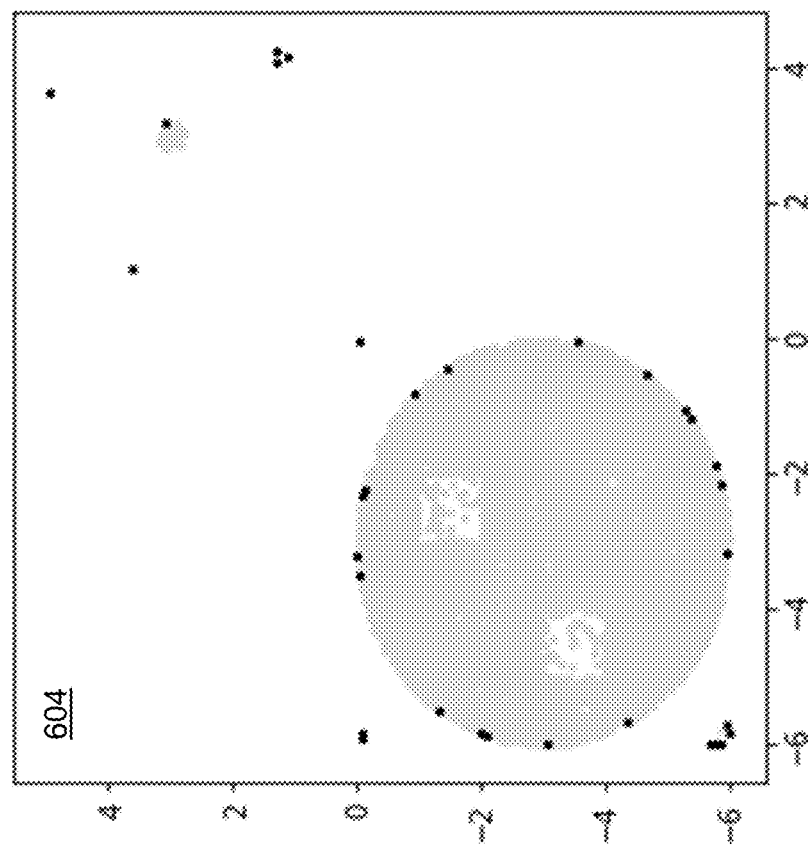
Figure 6B:
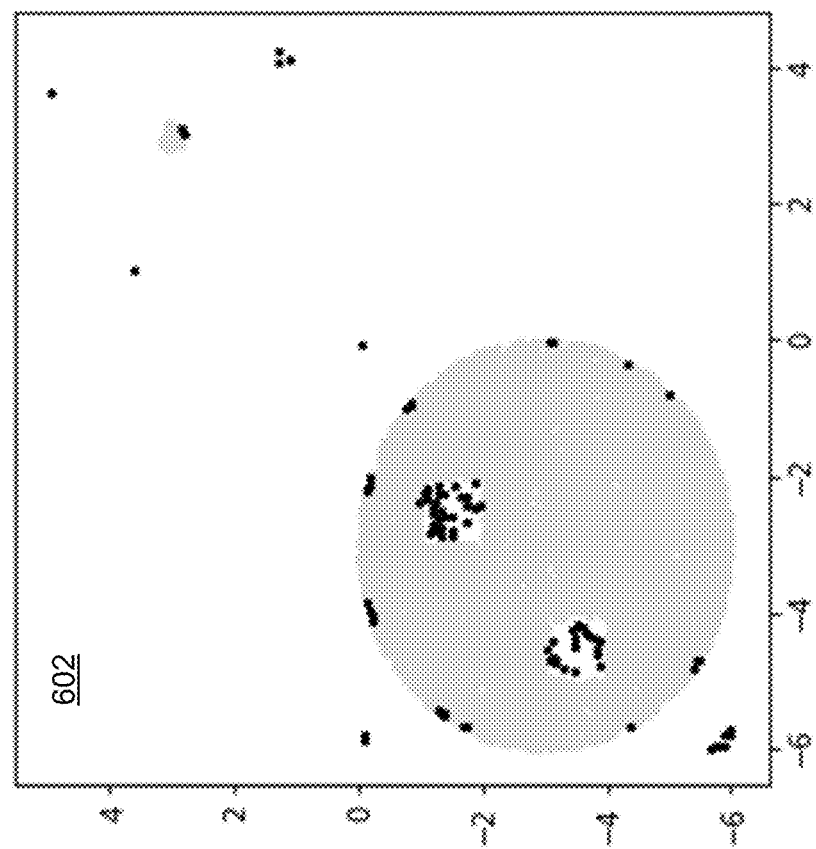

Referring to FIG. 6C, second performance results 604 are shown using an SVDD process applied to first dataset 600. The SVDD process applied is described in U.S. Patent Publication No. 2019/0042977, titled BANDWIDTH SELECTION IN SUPPORT VECTOR DATA DESCRIPTION FOR OUTLIER IDENTIFICATION, and assigned to SAS Institute Inc., the assignee of the present application. The SVDD determined inliers are shown in gray, and the SVDD determined outliers are shown in black. The SVDD failed to identify outliers in the sparse areas within the large cluster. The AUC score using the SVDD process was 0.66 using first dataset 600. The tuned LOF process provided significantly better outlier detection performance than the SVDD.

Figure 7:
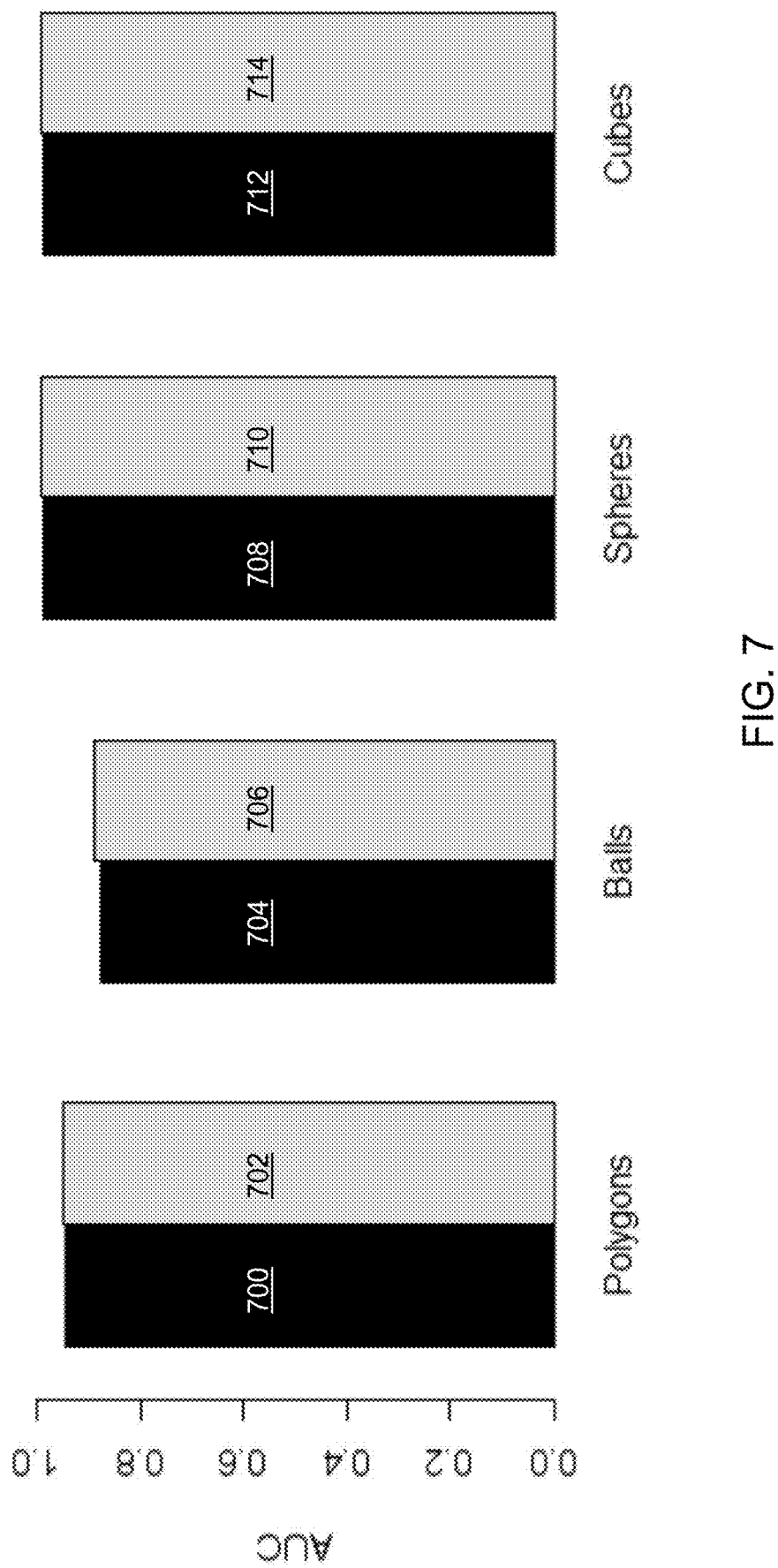
FIG. 7 provides a comparison between an LOF outlier identification with hyperparameter values computed using the operations of FIGS. 3A and 3B and optimal hyperparameter values using four datasets in accordance with an illustrative embodiment.
Figure 9A:
FIG. 9A graphically shows a first training dataset in accordance with an illustrative embodiment.
Figure 9B:
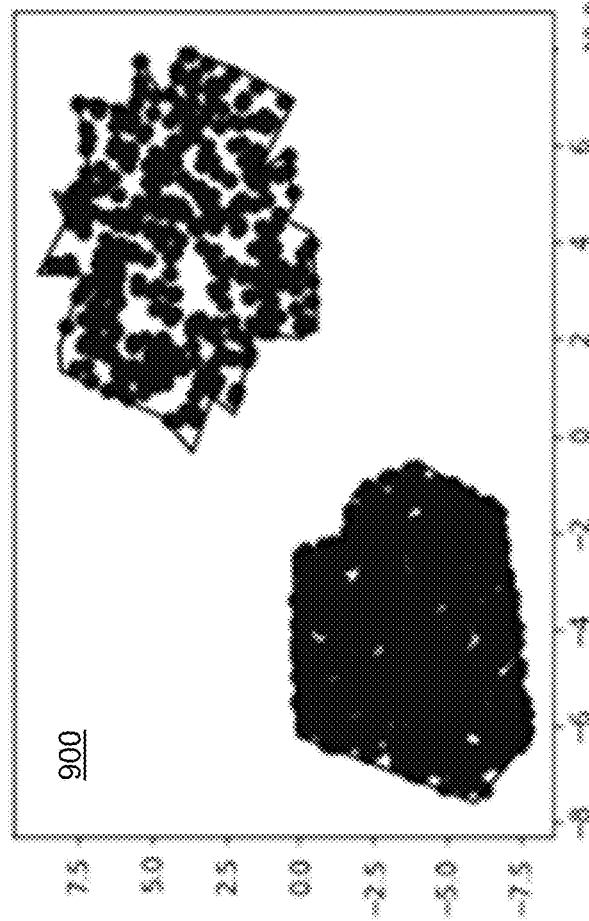
FIG. 9B graphically shows a first validation dataset created for the first training dataset of FIG. 9A in accordance with an illustrative embodiment.

Referring to FIG. 7, an AUC value comparison between the tuned LOF process and a second process using optimal hyperparameter values is shown for four datasets. The four datasets include a second dataset 900, a third dataset 1000, a fourth dataset (not shown), and a fifth dataset (not shown) each of which is a simulation created dataset. Second dataset 900 included 1,600 observations uniformly sampled within a mixture of two randomly generated polygons with 22% of the observations included as anomalies. One polygon had a higher density than the other as shown referring to FIG. 9A. Since no points were sampled outside the boundaries of the polygons, the anomaly proportion was zero in second dataset 900 as training dataset 124. 10,000 data points were included in a first validation dataset 902 that formed a dense two-dimensional (2-D) mesh grid with both axes ranging from −10 to 10 as shown referring to FIG. 9B. The points inside the true boundaries were labeled as normal, and the points outside the true boundaries were labeled anomalies.

Figure 10A:
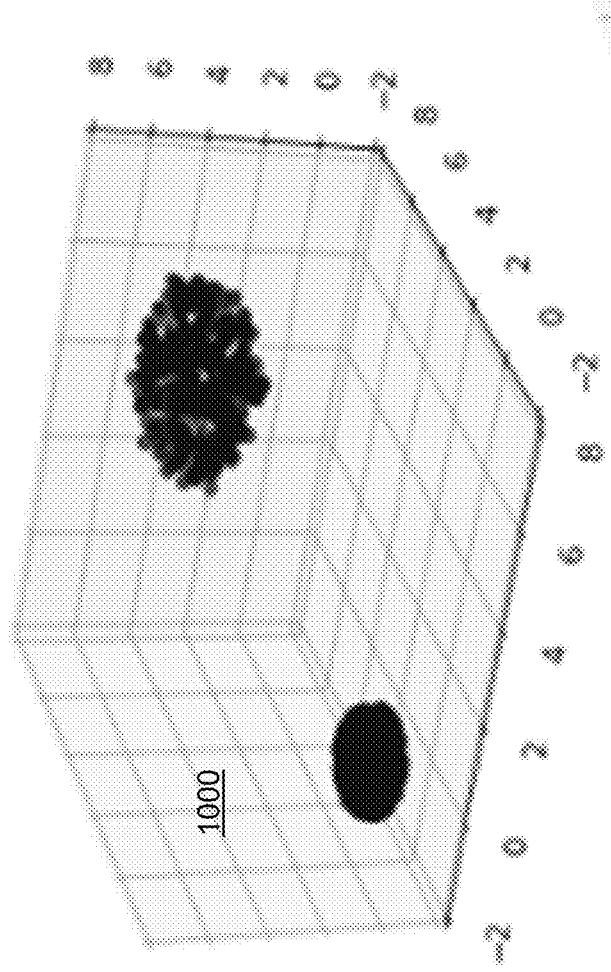
FIG. 10A graphically shows a second training dataset in accordance with an illustrative embodiment.
Figure 10B:
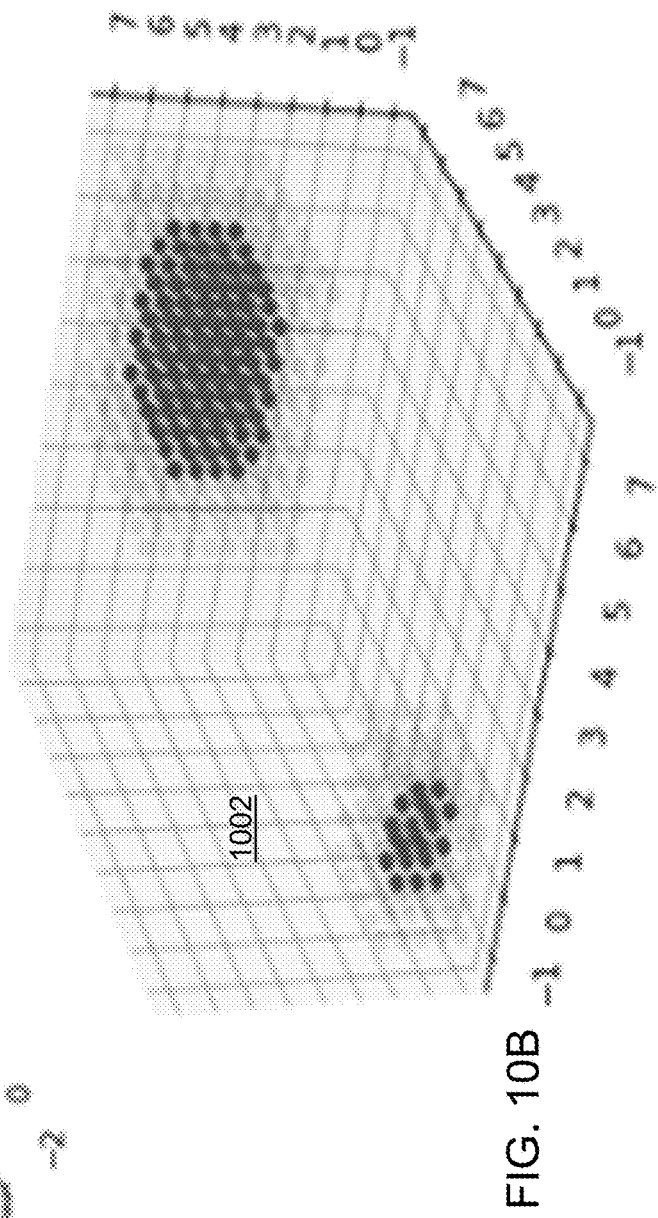
FIG. 10B graphically shows a second validation dataset created for the first training dataset of FIG. 10A in accordance with an illustrative embodiment.

Third dataset 1000 included 1,600 observations uniformly sampled within a mixture of three-dimensional balls with 15% of the observations included as anomalies. A ball centered at an origin has a smaller radius than a ball centered at (5,5,5) as shown referring to FIG. 10A. Since no points were sampled outside the boundary of the balls, the anomaly proportion was zero in third dataset 1000 as training dataset 124. The 637 points in a second validation dataset 1002 formed two 3-D cubes, with each cube enveloping one of the training balls as shown referring to FIG. 10B. The points inside the true boundaries were labeled as normal, and the points outside were labeled anomalies.

The fourth dataset included 100,000 observations uniformly sampled within a mixture of 100-dimensional spheres with 5% of the observations included as anomalies. The fifth dataset included 100,000 observations uniformly sampled within a mixture of 100-dimensional cubes with 5% of the observations included as anomalies.

Referring again to FIG. 7, a first AUC bar 700 shows the AUC score value computed using the tuned LOF process for first validation dataset 902, and a second AUC bar 702 shows the AUC score value computed using the optimal hyperparameter values for first validation dataset 902. A first AUC bar 704 shows the AUC score value computed using the tuned LOF process for second validation dataset 1002, and a second AUC bar 706 shows the AUC score value computed using the optimal hyperparameter values for second validation dataset 1002. A first AUC bar 708 shows the AUC score value computed using the tuned LOF process for the fourth dataset, and a second AUC bar 710 shows the AUC score value computed using the optimal hyperparameter values for the fourth dataset. A first AUC bar 712 shows the AUC score value computed using the tuned LOF process for the fifth dataset, and a second AUC bar 714 shows the AUC score value computed using the optimal hyperparameter values for the fifth dataset. The AUC score value using the tuned LOF process is very close to the result using the optimal hyperparameter values on the four simulated datasets.

Figure 8:
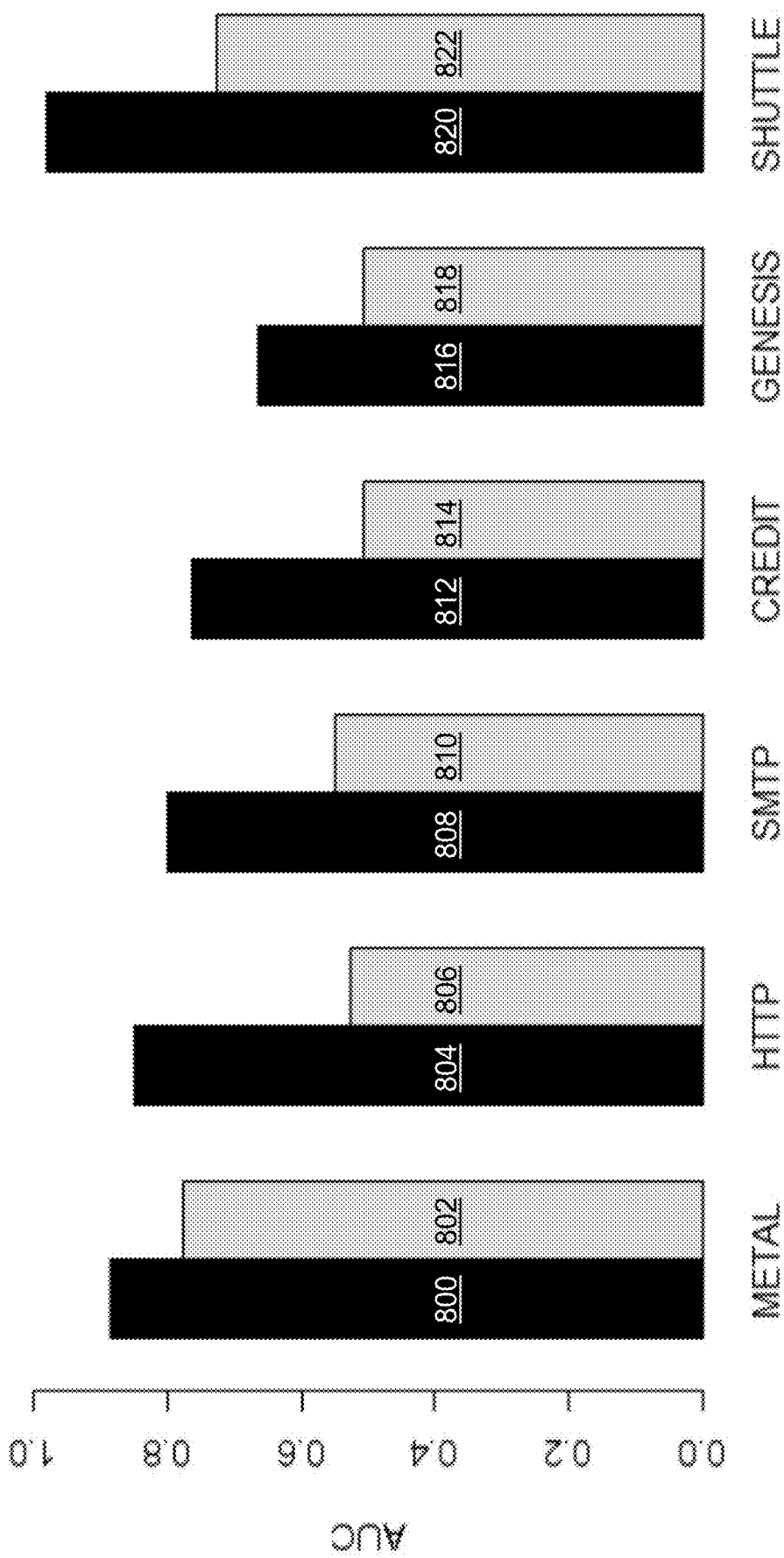
FIG. 8 provides a comparison between the LOF outlier identification with hyperparameter values computed using the operations of FIGS. 3A and 3B and optimal hyperparameter values using six additional datasets in accordance with an illustrative embodiment.

Referring to FIG. 8, the AUC value comparison between the tuned LOF process and the second process using default hyperparameter values is shown for six datasets in accordance with an illustrative embodiment. The six datasets include a sixth dataset, a seventh dataset, an eighth dataset, a ninth dataset, a tenth dataset, and an eleventh dataset each of which is a real dataset. The sixth dataset included 95 normal wafer observations with eight variables generated for metal fault detection with 16% of the observations included as anomalies. The seventh dataset included 61,886 normal http connection observations with 36 variables with 1.2% of the observations included as anomalies. The eighth dataset included 61,886 normal smtp connection observations with 36 variables with 0.6% of the observations included as anomalies. The ninth dataset included 142,157 normal credit card observations with 28 variables with 0.2% of the observations included as anomalies. The tenth dataset included 7,040 normal observations with 4 variables generated for Genesis demonstrator anomaly detection with 0.3% of the observations included as anomalies. The eleventh dataset included 36,486 normal observations with 9 variables generated from space shuttle data for anomaly detection with 7.7% of the observations included as anomalies.

A first AUC bar 800 shows the AUC score value computed using the tuned LOF process for the sixth dataset, and a second AUC bar 802 shows the AUC score value computed using the default hyperparameter values for the sixth dataset. A first AUC bar 804 shows the AUC score value computed using the tuned LOF process for the seventh dataset, and a second AUC bar 806 shows the AUC score value computed using the default hyperparameter values for the seventh dataset. A first AUC bar 808 shows the AUC score value computed using the tuned LOF process for the eighth dataset, and a second AUC bar 810 shows the AUC score value computed using the default hyperparameter values for the eighth dataset. A first AUC bar 812 shows the AUC score value computed using the tuned LOF process for the ninth dataset, and a second AUC bar 814 shows the AUC score value computed using the default hyperparameter values for the ninth dataset. A first AUC bar 816 shows the AUC score value computed using the tuned LOF process for the tenth dataset, and a second AUC bar 818 shows the AUC score value computed using the default hyperparameter values for the tenth dataset. A first AUC bar 820 shows the AUC score value computed using the tuned LOF process for the eleventh dataset, and a second AUC bar 822 shows the AUC score value computed using the default hyperparameter values for the eleventh dataset. The AUC score value using the tuned LOF process is much better than the result using the default hyperparameter values on all six real datasets.

Referring to FIG. 9C, an F1-score comparison as a function of various hyperparameter values computed using the tuned LOF process with first validation dataset 902. A first F1-curve 904 shows the F1-score as a function of the neighborhood size value for a contamination fractional value of 0.01. A second F1-curve 906 shows the F1-score as a function of the neighborhood size value for a contamination fractional value of 0.008. A third F1-curve 908 shows the F1-score as a function of the neighborhood size value for a contamination fractional value of 0.006. The dashed line shows the tuned values for the contamination fractional value as 0.01 and the neighborhood size value of 16 that are close to the optimal values for the specified plurality of values that was from 10 to 50 incrementing by 1 for the neighborhood size values, and the three contamination levels considered are 0.006, 0.008, and 0.01.

Referring to FIG. 9D, an AUC comparison as a function of various hyperparameter values computed using the tuned LOF process with first validation dataset 902. A first AUC 910 shows the AUC as a function of the neighborhood size value for a contamination fractional value of 0.01. A second AUC 912 shows the AUC as a function of the neighborhood size value for a contamination fractional value of 0.008. A third AUC 914 shows the AUC as a function of the neighborhood size value for a contamination fractional value of 0.006. The dashed line again shows the tuned values for the contamination fractional value as 0.01 and the neighborhood size value of 16 that are close to the optimal values for the specified plurality of values that was from 10 to 50 incrementing by 1 for the neighborhood size values, and the three contamination levels considered are 0.006, 0.008, and 0.01.

Figure 10C:
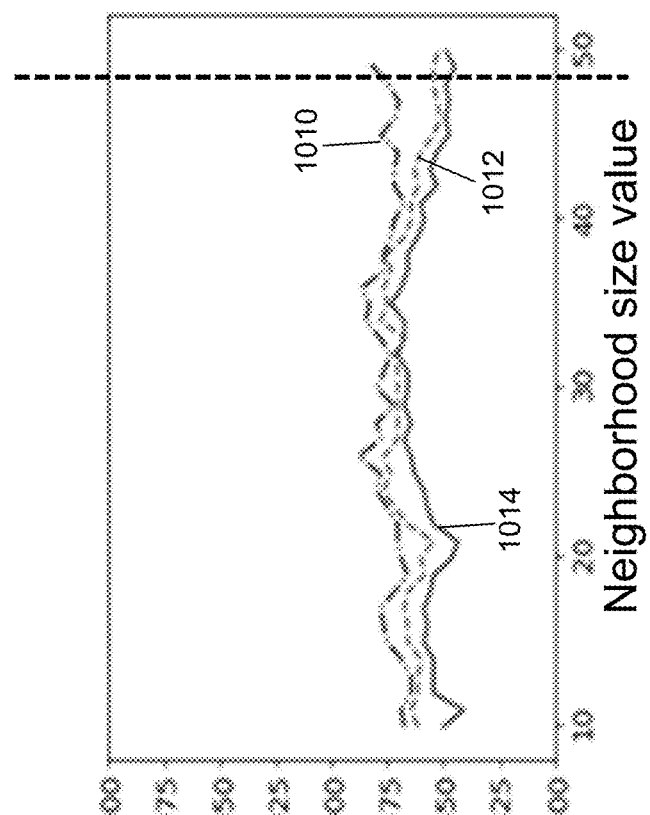
FIG. 10C shows an F1-score comparison as a function of various hyperparameter values computed using the second validation dataset of FIG. 10B in accordance with an illustrative embodiment.

Referring to FIG. 10C, an F1-score comparison as a function of various hyperparameter values computed using the tuned LOF process with second validation dataset 1002.

A first F1-curve 1004 shows the F1-score as a function of the neighborhood size value for a contamination fractional value of 0.01. A second F1-curve 1006 shows the F1-score as a function of the neighborhood size value for a contamination fractional value of 0.008. A third F1-curve 1008 shows the F1-score as a function of the neighborhood size value for a contamination fractional value of 0.006. The dashed line shows the tuned values for the contamination fractional value as 0.01 and the neighborhood size value of 48 that are close to the optimal values for the specified plurality of values that was from 10 to 50 incrementing by 1 for the neighborhood size values, and the three contamination levels considered are 0.006, 0.008, and 0.01.

Figure 10D:
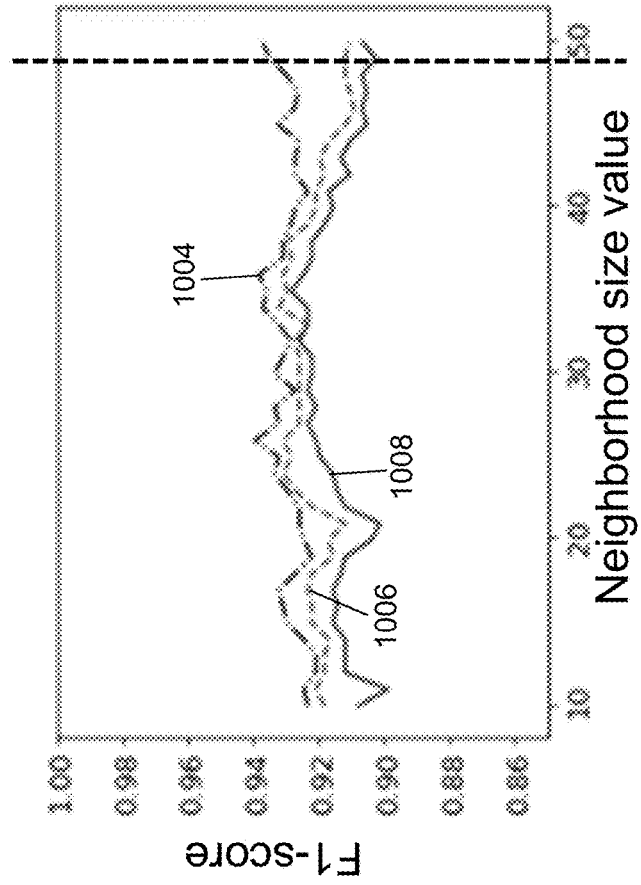
FIG. 10D shows an AUC comparison as a function of various hyperparameter values computed using the second validation dataset of FIG. 10B in accordance with an illustrative embodiment.

Referring to FIG. 10D, an AUC comparison as a function of various hyperparameter values computed using the tuned LOF process with second validation dataset 1002. A first AUC 1010 shows the AUC as a function of the neighborhood size value for a contamination fractional value of 0.01. A second AUC 1012 shows the AUC as a function of the neighborhood size value for a contamination fractional value of 0.008. A third AUC 1014 shows the AUC as a function of the neighborhood size value for a contamination fractional value of 0.006. The dashed line again shows the tuned values for the contamination fractional value as 0.01 and the neighborhood size value of 48 that are close to the optimal values for the specified plurality of values that was from 10 to 50 incrementing by 1 for the neighborhood size values, and the three contamination levels considered are 0.006, 0.008, and 0.01.

Referring to FIG. 11, a first performance comparison table 1100 comparing the tuned LOF process with the optimal hyperparameter values (Best) using first validation dataset 902 (Polygons), second validation dataset 1002 (Balls), and a third validation dataset (Metal) are shown in accordance with an illustrative embodiment. The third validation dataset was generated from a LAM 9600 metal etcher over the course of etching 129 wafers (108 normal wafers and 21 wafers in which faults were intentionally induced during the same experiments). In training dataset 124, 90% of the normal wafers data was included. The third validation dataset was the entire dataset. The tuned LOF has both F1-score and AUC values that are very close to the optimal upper bound values on the specified plurality of values.

Figure 12A:
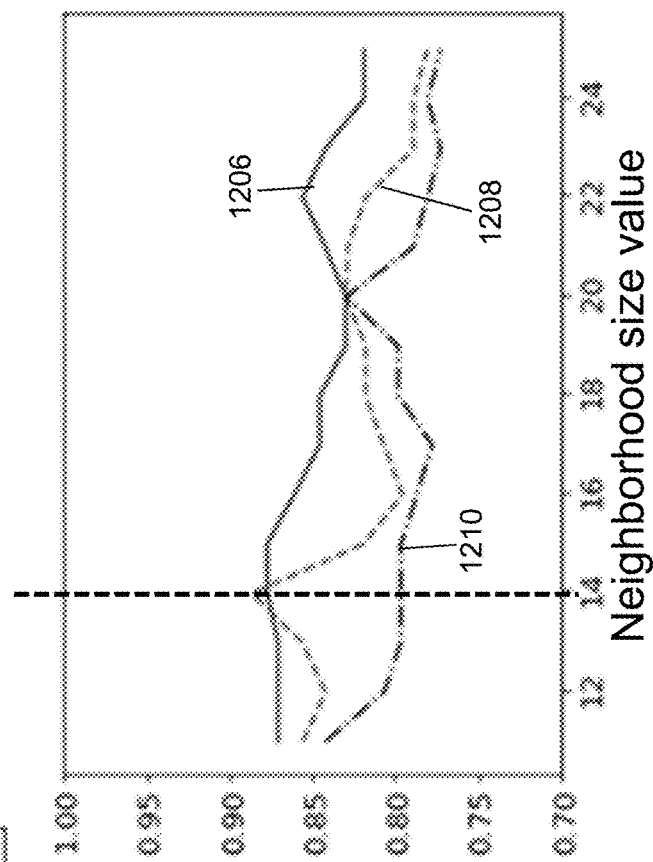
FIG. 12A shows an F1-score comparison as a function of various hyperparameter values computed using a third validation dataset in accordance with an illustrative embodiment.

Referring to FIG. 12A, an F1-score comparison as a function of various hyperparameter values computed using the tuned LOF process with the third validation dataset. A first F1-curve 1200 shows the F1-score as a function of the neighborhood size value for a contamination fractional value of 0.08. A second F1-curve 1202 shows the F1-score as a function of the neighborhood size value for a contamination fractional value of 0.1. A third F1-curve 1204 shows the F1-score as a function of the neighborhood size value for a contamination fractional value of 0.12. The dashed line shows the tuned values for the contamination fractional value as 0.1 and the neighborhood size value of 14 that are close to the optimal values for the specified plurality of values that was from 10 to 25 incrementing by 1 for the neighborhood size values, and the three contamination levels considered are 0.08, 0.1, and 0.12. The F1-score at the tuned hyperparameter values agrees well with the actual peak position.

Figure 12B:
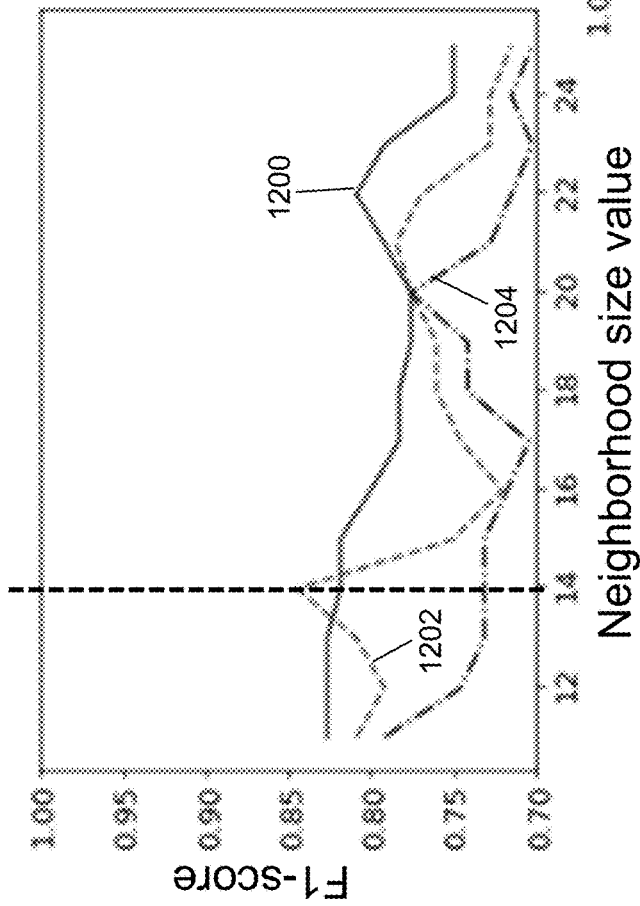
FIG. 12B shows an AUC comparison as a function of various hyperparameter values computed using the third validation dataset in accordance with an illustrative embodiment.

Referring to FIG. 12B, an AUC comparison as a function of various hyperparameter values computed using the tuned LOF process with the third validation dataset. A first AUC 1206 shows the AUC as a function of the neighborhood size value for a contamination fractional value of 0.08. A second AUC 1208 shows the AUC as a function of the neighborhood size value for a contamination fractional value of 0.1. A third AUC 1210 shows the AUC as a function of the neighborhood size value for a contamination fractional value of 0.12. The dashed line again shows the tuned values for the contamination fractional value as 0.1 and the neighborhood size value of 14 that are close to the optimal values for the specified plurality of values that was from 10 to 25 incrementing by 1 for the neighborhood size values, and the three contamination levels considered are 0.08, 0.1, and 0.12. The AUC at the tuned hyperparameter values agrees well with the actual peak position.

To evaluate the performance of the tuned LOF process on large datasets, Gaussian random projection was implemented as the dimension reduction method. The computation cost of the tuned LOF process is $NN_v$, where $N_v$ is a number of variables included in each observation vector, which may be reduced using a dimension reduction method, times the cost of a k-nearest-neighbor (KNN) query, which is needed in searching the neighborhood for each sample point. For low-dimensional data, a grid-based approach can be used to search for nearest neighbors so that the KNN query is constant in N. For high-dimensional data, the KNN query on average takes $O(\log N)$, with the worst case of $O(N)$, which would make the tuned LOF process slow for large, high-dimensional data. Use of Gaussian random projection for dimension reduction made the computation feasible for the repetitive running of the tuned LOF process on large datasets. In practice, the dimension of the dataset can be reduced to a largest subspace that the computing resources can handle.

Figure 13:
FIG. 13 provides a second performance comparison table of an LOF outlier identification with hyperparameter values computed using the operations of FIGS. 3A and 3B and optimal hyperparameter values using two datasets in accordance with an illustrative embodiment.

Referring to FIG. 13, a second performance comparison table 1300 comparing the tuned LOF process with the optimal hyperparameter values (Best) using a fourth validation dataset (Spheres×100) and a fifth validation dataset (Cubes×100) is shown. The fourth validation dataset was generated with 100 mixtures of 100-dimensional spheres data. In each mixture, a twelfth training dataset included 100,000 points uniformly sampled from a random number (between 2 and 10) of spheres. Since no points were sampled outside the boundary of the spheres, the anomaly proportion was zero in the twelfth training dataset as training dataset 124. For the fourth validation dataset in each mixture, 10,000 points were randomly sampled around each of the training spheres with 0.05 probability of being outside the boundaries (anomalies).

The fifth validation dataset was generated with 100 mixtures of 100-dimensional cubes data. In each mixture, a thirteenth training dataset included 100,000 points uniformly sampled from a random number (between 2 and 10) of cubes with dimension equal to 100. Since no points were sampled outside the boundary of the cubes, the anomaly proportion was zero in the thirteenth training dataset as training dataset 124. For the fifth validation dataset in each mixture, 10,000 points were randomly sampled around each of the training cubes with 0.05 probability of being outside the boundaries (anomalies).

Second performance comparison table 1300 shows that the mean F1-score and the mean AUC after tuning were high and approach the best upper bound values for both the fourth validation dataset and the fifth validation dataset indicating the good predictive performance of the tuned LOF process. The numbers in parentheses indicate the standard error. For the reduced subspace dimension of 3 with sample size 100,000, the average execution time for the tuned LOF process with both the fourth validation dataset and the fifth validation dataset was less than 6 seconds, which shows scalability of the tuned LOF process for a large sample size.

Figure 14:
FIG. 14 provides a third performance comparison table of an LOF outlier identification with hyperparameter values computed using the operations of FIGS. 3A and 3B and two other outlier identification models using four datasets in accordance with an illustrative embodiment.

Referring to FIG. 14, a third performance comparison table 1400 comparing the tuned LOF process (LOF) with a one-class SVM model and an IForest model is shown for a sixth validation dataset (Http), a seventh validation dataset (Smtp), an eighth validation dataset (Credit), and a ninth validation dataset (Mnist). SVM and IForest are benchmark anomaly detection methods. The sixth validation dataset was generated with a subset from the original KDD Cup 1999 dataset from the UCI Machine Learning Repository, where the service attribute is http. The training dataset included 61,886 observations of normal internet connections with 36 continuous variables. The sixth validation dataset included 4,045 anomalies out of 623,091 samples (0.6%).

The seventh validation dataset was generated with a subset from the original KDD Cup 1999 dataset from the UCI Machine Learning Repository, where the service attribute is smtp. The training dataset included 9,598 observations of normal internet connections with 36 continuous variables. The sixth validation dataset included 1,183 anomalies out 96,554 observations (1.2%).

The eighth validation dataset was collected during a research collaboration of Worldline and the Machine Learning Group of Université Libre de Bruxelles, and included 284,807 records with 28 continuous variables. The training dataset included 142,157 normal credit card activity records. The eighth validation dataset included 492 fraudulent activity records out of 284,807 samples (0.2%).

The ninth validation dataset was a subset from the publicly available MNIST database of handwritten digits. The training dataset included 12,665 samples for digits "0" and "1", which are defined as normal data in this specific application. The validation set included 10,000 samples for all 10 digits, where there were 7,885 (78.9%) anomalies.

For the sixth validation dataset (Http), seventh validation dataset (Smtp), and eighth validation dataset (Credit), Gaussian random projection was used to reduce the dimension to 3. For the ninth validation dataset (Mnist), the reduced subspace dimension was 10 because the original data was high-dimensional. The random projection process was repeated 10 times. The hyperparameters in one-class SVM and isolation forest were chosen to be the configuration that has the highest F1-score and AUC on each validation dataset.

Third performance comparison table 1400 shows the mean of the F1-score and the AUC between the different methods using each of the sixth validation dataset (Http), the seventh validation dataset (Smtp), the eighth validation dataset (Credit), and the ninth validation dataset (Mnist). The numbers in parentheses indicate the standard error. For the sixth validation dataset (Http) and the seventh validation dataset (Smtp), the performance of the tuned LOF process was comparable to the best result from one-class SVM. For the eighth validation dataset (Credit) and the ninth validation dataset (Mnist), the tuned LOF process had a higher mean F1-score and AUC than the other two benchmark methods. The F1-scores for all three methods was low for the eighth validation dataset (Credit), which may indicate that the anomalies are not fully identifiable from the normal data in this case.

The tuned LOF process provides a heuristic methodology for jointly tuning the hyperparameters of contamination and neighborhood size of the LOF model. The comparative performance was evaluated using both small and large datasets. In small data sets, the tuned hyperparameters correspond well to values that have the highest F1-score and AUC. In large datasets, Gaussian random projection was used as a preprocessing step for dimension reduction with the purpose of improving a computational efficiency. The predictive performance of the tuned LOF process is comparable to the predictive performance with the best results from one-class SVM on the Http and Smtp datasets, and the tuned LOF process outperforms all the other methods on the Credit and Mnist datasets.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

(A) define a contamination value;

(B) select a neighborhood size value from a plurality of neighborhood size values;

(C) compute a local outlier factor (LOF) score for each observation vector of a plurality of observation vectors using the selected neighborhood size value, wherein each observation vector of the plurality of observation vectors includes a variable value for each variable of a plurality of variables;

(D) select a number of outlier observation vectors from the plurality of observation vectors to define an outlier set of observation vectors, wherein the number of outlier observation vectors is the defined contamination value, wherein the outlier set of observation vectors have highest computed LOF scores of the plurality of observation vectors;

(E) compute an outlier mean value of the LOF scores computed for the outlier set of observation vectors;

(F) compute an outlier variance value of the LOF scores computed for the outlier set of observation vectors;

(G) select a number of inlier observation vectors from the plurality of observation vectors to define an inlier set of observation vectors, wherein the number of inlier observation vectors is the defined contamination value, wherein the inlier set of observation vectors have highest computed LOF scores of the plurality of observation vectors that are not included in the outlier set of observation vectors;

(H) compute an inlier mean value of the LOF scores computed for the inlier set of observation vectors;

(I) compute an inlier variance value of the LOF scores computed for the inlier set of observation vectors;

(J) compute a difference value using the computed outlier mean value, the computed outlier variance value, the computed inlier mean value, and the computed inlier variance value;

(K) repeat (B) to (J) with each remaining neighborhood size value of the plurality of neighborhood size values as the selected neighborhood size value;

(L) select a tuned neighborhood size value as the neighborhood size value associated with an extremum value of the difference value computed for each neighborhood size value of the plurality of neighborhood size values; and (M) output the selected, tuned neighborhood size value, an outlier threshold that is a lowest LOF score of the LOF scores computed for the outlier set of observation vectors, and the defined contamination value for determining if a new observation vector is an outlier observation vector using a trained LOF model that includes the selected, tuned neighborhood size value, the outlier threshold, and the defined contamination value.

2. The non-transitory computer-readable medium of claim 1, wherein the outlier mean value, the outlier variance value, the inlier mean value, and the inlier variance value are computed for the logarithm of the LOF scores in (E), (F), (H), and (I), respectively.

3. The non-transitory computer-readable medium of claim 1, wherein, after (K) and before (L), the computer-readable instructions further cause the computing device to:

(AA) compute a grid outlier mean value from the outlier mean value computed for each neighborhood size value of the plurality of neighborhood size values;

(AB) compute a grid outlier variance value from the outlier mean value computed for each neighborhood size value of the plurality of neighborhood size values;

(AC) compute a grid inlier mean value from the inlier mean value computed for each neighborhood size value of the plurality of neighborhood size values;

(AD) compute a grid inlier variance value from the inlier mean value computed for each neighborhood size value of the plurality of neighborhood size values;

(AE) compute a non-centrality parameter value using the computed grid outlier mean value, the computed grid outlier variance value, the grid computed inlier mean value, and the computed grid inlier variance value;

(AF) compute a degrees of freedom value using the defined contamination value; and (AG) repeat (A) to (K) and (AA) to (AF) with each remaining contamination value of a plurality of contamination values as the defined contamination value;

wherein, after (AG) and before (L), the computer-readable instructions further cause the computing device to (AH) compute a probability value for each contamination value of the plurality of contamination values using the difference value computed for each selected, tuned neighborhood size value, the non-centrality parameter value, and the degrees of freedom value computed for each contamination value of the plurality of contamination values; and (AI) select a tuned contamination value as the contamination value associated with a second extremum value of the probability value computed for each contamination value of the plurality of contamination values, wherein the defined contamination value output in (M) is the selected, tuned contamination value.

4. The non-transitory computer-readable medium of claim 3, wherein, after (AI) and before (M), the computer-readable instructions further cause the computing device to:

select a second tuned neighborhood size value as the neighborhood size value associated with the selected, tuned contamination value, wherein the selected, tuned neighborhood size value output in (M) is the selected, second tuned neighborhood size value.

5. The non-transitory computer-readable medium of claim 4, wherein, after selecting the second tuned neighborhood size value, the computer-readable instructions further cause the computing device to:

receive the new observation vector;

determine a plurality of nearest neighbors to the received new observation vector from the plurality of observation vectors, wherein a number of the plurality of nearest neighbors is the selected, second tuned neighborhood size value, wherein the plurality of nearest neighbors have minimum distances to the new observation vector;

compute a second LOF score for the received new observation vector using the determined plurality of nearest neighbors; and when the computed second LOF score is greater than the outlier threshold, identify the received new observation vector as an outlier.

6. The non-transitory computer-readable medium of claim 5, wherein when the received new observation vector is identified as an outlier, output an indicator of detection of an anomaly.

7. The non-transitory computer-readable medium of claim 3, wherein the probability value is computed using a non-central t distribution.

8. The non-transitory computer-readable medium of claim 3, wherein the non-centrality parameter value is computed using $$p_{c_n} = \frac{M_{c_n,out} - M_{c_n,in}}{\sqrt{\frac{1}{c_n}(V_{c_n,out} + V_{c_n,in})}},$$

where $M_{c_n,out}$ is the computed grid outlier mean value, $V_{c_n,out}$ is the computed grid outlier variance value, $M_{c_n,in}$ is the grid computed inlier mean value, $V_{c_n,in}$ is the computed grid inlier variance value, and $c_n$ is the defined contamination value.

9. The non-transitory computer-readable medium of claim 3, wherein the degrees of freedom value is computed using $f_{c_n} = 2c_n - 2$ where $c_n$ is the defined contamination value.

10. The non-transitory computer-readable medium of claim 1, wherein the difference value is computed using $T_{c_n,k_n}$ $$T_{c_n,k_n} = \frac{\mu_{c_n,k_n,out} - \mu_{c_n,k_n,in}}{\sqrt{\frac{1}{c_n}(v_{c_n,k_n,out} + v_{c_n,k_n,in})}},$$

where $\mu_{c_n,k_n,out}$ is the computed outlier mean value, $v_{c_n,k_n,out}$ is the computed outlier variance value, $\mu_{c_n,k_n,in}$ is the computed inlier mean value, $v_{c_n,k_n,in}$ is the computed inlier variance value, and $c_n$ is the defined contamination value.

11. The non-transitory computer-readable medium of claim 10, wherein the outlier mean value is computed using $$\mu_{c_n,k_n,out} = \frac{\sum_{i=1}^{c_n} \ln LOF_i}{c_n},$$

where $LOF_i$ is the computed LOF score of an $i^{th}$ selected outlier observation vector of the outlier set of observation vectors, and $\ln LOF_i$ is a natural logarithm of $LOF_i$.

12. The non-transitory computer-readable medium of claim 10, wherein the outlier variance value is computed using $$v_{c_n,k_n,out} = \frac{\sum_{i=1}^{c_n} (\ln(LOF_i) - \mu_{c_n,k_n,out})^2}{c_n},$$

where $LOF_i$ is the computed LOF score of an $i^{th}$ selected outlier observation vector of the outlier set of observation vectors, and $\ln LOF_i$ is a natural logarithm of $LOF_i$.

13. The non-transitory computer-readable medium of claim 10, wherein the inlier mean value is computed using $$\mu_{c_n,k_n,in} = \frac{\sum_{i=1}^{c_n} \ln LOF_i}{c_n},$$

where $LOF_i$ is the computed LOF score of an $i^{th}$ selected inlier observation vector of the inlier set of observation vectors, and $\ln LOF_i$ is a natural logarithm of $LOF_i$.

14. The non-transitory computer-readable medium of claim 10, wherein the inlier variance value is computed using $$v_{c_n,k_n,in} = \frac{\sum_{i=1}^{c_n} (\ln(LOF_i) - \mu_{c_n,k_n,in})^2}{c_n},$$

where $LOF_i$ is the computed LOF score of an $i^{th}$ selected inlier observation vector of the inlier set of observation vectors, and $\ln LOF_i$ is a natural logarithm of $LOF_i$.

15. The non-transitory computer-readable medium of claim 1, wherein, before (C), the computer-readable instructions further cause the computing device to:
apply a dimension reduction method to each observation vector of the plurality of observation vectors to define principal components; and
project each observation vector of the plurality of observation vectors into a space defined by the principal components,
wherein each observation vector of the plurality of observation vectors in (C) is the projected observation vector.

16. The non-transitory computer-readable medium of claim 1, wherein, after (M), the computer-readable instructions further cause the computing device to:
receive the new observation vector;
determine a plurality of nearest neighbors to the received new observation vector from the plurality of observation vectors, wherein a number of the plurality of nearest neighbors is the selected, tuned neighborhood size value, wherein the plurality of nearest neighbors have minimum distances to the new observation vector;
compute a second LOF score for the received new observation vector using the determined plurality of nearest neighbors; and
when the computed second LOF score is greater than the outlier threshold, identify the received new observation vector as an outlier.

17. The non-transitory computer-readable medium of claim 16, wherein when the received new observation vector is identified as an outlier, output an indicator of detection of an anomaly.

18. The non-transitory computer-readable medium of claim 16, wherein after (L), the plurality of observation vectors is output to determine the plurality of nearest neighbors to the received new observation vector.

19. A computing device comprising:
a processor; and
a non-transitory computer-readable medium operably coupled to the processor, the computer-readable medium having computer-readable instructions stored thereon that, when executed by the processor, cause the computing device to
(A) define a contamination value;
(B) select a neighborhood size value from a plurality of neighborhood size values;
(C) compute a local outlier factor (LOF) score for each observation vector of a plurality of observation vectors using the selected neighborhood size value, wherein each observation vector of the plurality of observation vectors includes a variable value for each variable of a plurality of variables;
(D) select a number of outlier observation vectors from the plurality of observation vectors to define an outlier set of observation vectors, wherein the number of outlier observation vectors is the defined contamination value, wherein the outlier set of observation vectors have highest computed LOF scores of the plurality of observation vectors;
(E) compute an outlier mean value of the LOF scores computed for the outlier set of observation vectors;
(F) compute an outlier variance value of the LOF scores computed for the outlier set of observation vectors;
(G) select a number of inlier observation vectors from the plurality of observation vectors to define an inlier set of observation vectors, wherein the number of inlier observation vectors is the defined contamination value, wherein the inlier set of observation vectors have highest computed LOF scores of the plurality of observation vectors that are not included in the outlier set of observation vectors;
(H) compute an inlier mean value of the LOF scores computed for the inlier set of observation vectors;
(I) compute an inlier variance value of the LOF scores computed for the inlier set of observation vectors;
(J) compute a difference value using the computed outlier mean value, the computed outlier variance value, the computed inlier mean value, and the computed inlier variance value;
(K) repeat (B) to (J) with each remaining neighborhood size value of the plurality of neighborhood size values as the selected neighborhood size value;
(L) select a tuned neighborhood size value as the neighborhood size value associated with an extremum value of the difference value computed for each neighborhood size value of the plurality of neighborhood size values; and (M) output the selected, tuned neighborhood size value, an outlier threshold that is a lowest LOF score of the LOF scores computed for the outlier set of observation vectors, and the defined contamination value for determining if a new observation vector is an outlier observation vector using a trained LOF model that includes the selected, tuned neighborhood size value, the outlier threshold, and the defined contamination value.

20. A method of determining hyperparameter values for a local outlier factor outlier detection, the method comprising:

(A) defining, by a computing device, a contamination value;

(B) selecting, by the computing device, a neighborhood size value from a plurality of neighborhood size values;

(C) computing, by the computing device, a local outlier factor (LOF) score for each observation vector of a plurality of observation vectors using the selected neighborhood size value, wherein each observation vector of the plurality of observation vectors includes a variable value for each variable of a plurality of variables;

(D) selecting, by the computing device, a number of outlier observation vectors from the plurality of observation vectors to define an outlier set of observation vectors, wherein the number of outlier observation vectors is the defined contamination value, wherein the outlier set of observation vectors have highest computed LOF scores of the plurality of observation vectors;

(E) computing, by the computing device, an outlier mean value of the LOF scores computed for the outlier set of observation vectors;

(F) computing, by the computing device, an outlier variance value of the LOF scores computed for the outlier set of observation vectors;

(G) selecting, by the computing device, a number of inlier observation vectors from the plurality of observation vectors to define an inlier set of observation vectors, wherein the number of inlier observation vectors is the defined contamination value, wherein the inlier set of observation vectors have highest computed LOF scores of the plurality of observation vectors that are not included in the outlier set of observation vectors;

(H) computing, by the computing device, an inlier mean value of the LOF scores computed for the inlier set of observation vectors;

(I) computing, by the computing device, an inlier variance value of the LOF scores computed for the inlier set of observation vectors;

(J) computing, by the computing device, a difference value using the computed outlier mean value, the computed outlier variance value, the computed inlier mean value, and the computed inlier variance value;

(K) repeating, by the computing device, (B) to (J) with each remaining neighborhood size value of the plurality of neighborhood size values as the selected neighborhood size value;

(L) selecting, by the computing device, a tuned neighborhood size value as the neighborhood size value associated with an extremum value of the difference value computed for each neighborhood size value of the plurality of neighborhood size values; and (M) outputting, by the computing device, the selected, tuned neighborhood size value, an outlier threshold that is a lowest LOF score of the LOF scores computed for the outlier set of observation vectors, and the defined contamination value for determining if a new observation vector is an outlier observation vector using a trained LOF model that includes the selected, tuned neighborhood size value, the outlier threshold, and the defined contamination value.

21. The method of claim 20, wherein the outlier mean value, the outlier variance value, the inlier mean value, and the inlier variance value are computed for the logarithm of the LOF scores in (E), (F), (H), and (I), respectively.

22. The method of claim 20, wherein, after (K) and before (L), further comprising:

(AA) computing, by the computing device, a grid outlier mean value from the outlier mean value computed for each neighborhood size value of the plurality of neighborhood size values;

(AB) computing, by the computing device, a grid outlier variance value from the outlier mean value computed for each neighborhood size value of the plurality of neighborhood size values;

(AC) computing, by the computing device, a grid inlier mean value from the inlier mean value computed for each neighborhood size value of the plurality of neighborhood size values;

(AD) computing, by the computing device, a grid inlier variance value from the inlier mean value computed for each neighborhood size value of the plurality of neighborhood size values;

(AE) computing, by the computing device, a non-centrality parameter value using the computed grid outlier mean value, the computed grid outlier variance value, the grid computed inlier mean value, and the computed grid inlier variance value;

(AF) computing, by the computing device, a degrees of freedom value using the defined contamination value;

(AG) repeating, by the computing device, (A) to (K) and (AA) to (AF) with each remaining contamination value of a plurality of contamination values as the defined contamination value;

wherein, after (AG) and before (L), the computer-readable instructions further cause the computing device to (AH) computing, by the computing device, a probability value for each contamination value of the plurality of contamination values using the difference value computed for each selected, tuned neighborhood size value, the non-centrality parameter value, and the degrees of freedom value computed for each contamination value of the plurality of contamination values; and (AI) selecting, by the computing device, a tuned contamination value as the contamination value associated with a second extremum value of the probability value computed for each contamination value of the plurality of contamination values, wherein the defined contamination value output in (M) is the selected, tuned contamination value.

23. The method of claim 22, wherein, after (AI) and before (M), further comprising:

selecting, by the computing device, a second tuned neighborhood size value as the neighborhood size value associated with the selected, tuned contamination value, wherein the selected, tuned neighborhood size value output in (M) is the selected, second tuned neighborhood size value.

24. The method of claim 22, wherein the probability value is computed using a non-central t distribution.

25. The method of claim 22, wherein the non-centrality parameter value is computed using $$p_{c_n} = \frac{M_{c_n,out} - M_{c_n,in}}{\sqrt{\frac{1}{c_n}(V_{c_n,out} + V_{c_n,in})}},$$

where $M_{c_n,out}$ is the computed grid outlier mean value, $V_{c_n,out}$ is the computed grid outlier variance value, $M_{c_n,in}$ is the grid computed inlier mean value, $V_{c_n,in}$ is the computed grid inlier variance value, and $c_n$ is the defined contamination value.

26. The method of claim 22, wherein the degrees of freedom value is computed using $f_{c_n}=2c_n-2$ where $c_n$ is the defined contamination value.

27. The method of claim 20, wherein the difference value is computed using $$T_{c_n,k_n} = \frac{\mu_{c_n,k_n,out} - \mu_{c_n,k_n,in}}{\sqrt{\frac{1}{c_n}(v_{c_n,k_n,out} + v_{c_n,k_n,in})}},$$

where $\mu_{c_n,k_n,out}$ is the computed outlier mean value, $v_{c_n,k_n,out}$ is the computed outlier variance value, $\mu_{c_n,k_n,in}$ is the computed inlier mean value, $v_{c_n,k_n,in}$ is the computed inlier variance value, and $c_n$ is the defined contamination value.

28. The method of claim 27, wherein the outlier mean value is computed using $$\mu_{c_n,k_n,out} = \frac{\sum_{i=1}^{c_n} \ln LOF_i}{c_n},$$

where $LOF_i$ is the computed LOF score of an $i^{th}$ selected outlier observation vector of the outlier set of observation vectors, and $\ln LOF_i$ is a natural logarithm of $LOF_i$.

29. The method of claim 27, wherein the outlier variance value is computed using $$v_{c_n,k_n,out} = \frac{\sum_{i=1}^{c_n} (\ln(LOF_i) - \mu_{c_n,k_n,out})^2}{c_n},$$

where $LOF_i$ is the computed LOF score of an $i^{th}$ selected outlier observation vector of the outlier set of observation vectors, and $\ln LOF_i$ is a natural logarithm of $LOF_i$.

30. The method of claim 20, wherein, after (M), further comprising:

receiving, by the computing device, the new observation vector;

determining, by the computing device, a plurality of nearest neighbors to the received new observation vector from the plurality of observation vectors, wherein a number of the plurality of nearest neighbors is the selected, tuned neighborhood size value, wherein the plurality of nearest neighbors have minimum distances to the new observation vector;

computing, by the computing device, a second LOF score for the received new observation vector using the determined plurality of nearest neighbors; and when the computed second LOF score is greater than the outlier threshold, identifying, by the computing device, the received new observation vector as an outlier.

* * * * *

UNITED STATES PATENT AND TRADEMARK OFFICE
CERTIFICATE OF CORRECTION

PATENT NO. : 10,509,847 B1
APPLICATION NO. : 16/411214
DATED : December 17, 2019
INVENTOR(S) : Zekun Xu et al.

It is certified that error appears in the above-identified patent and that said Letters Patent is hereby corrected as shown below:

In the Specification

Column 15, Lines 25-30:

Delete the phrase "for example, using $c_{tun} = c_{tun} = \arg\max_{i=1,\ldots,N_c} PV_i \cdot PV_i$," and replace with --for example, using $c_{tun} = \arg\max_{i=1,\ldots,N_c} PV_i$--.

In the Claims

Claim 10, Column 28, Lines 56-60:

Delete the phrase "the difference value is computed using $T_{c_n,k_n} T_{c_n,k_n} = \frac{\mu_{c_n,k_n,out} - \mu_{c_n,k_n,in}}{\sqrt{\frac{1}{c_n}(v_{c_n,k_n,out} + v_{c_n,k_n,in})}}$,"

and replace with --the difference value is computed using $T_{c_n,k_n} = \frac{\mu_{c_n,k_n,out} - \mu_{c_n,k_n,in}}{\sqrt{\frac{1}{c_n}(v_{c_n,k_n,out} + v_{c_n,k_n,in})}}$--.

Signed and Sealed this
Third Day of March, 2020

Andrei Iancu
*Director of the United States Patent and Trademark Office*